INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY [signature]
ATTORNEY

INVENTOR
JAMES P. O'CONNELL
BY
ATTORNEY

INVENTOR
JAMES P. O'CONNELL
BY [signature]
ATTORNEY

United States Patent Office 3,552,072

Patented Jan. 5, 1971

3,552,072

METHOD AND APPARATUS FOR HOUSING AN ENCLOSED AREA WITH AERO-TRUSSED STRUCTURES

James P. O'Connell, 3 Rosemont St., Malden, Mass. 02148

Filed Oct. 11, 1968, Ser. No. 766,754

Int. Cl. E04b *1/345, 7/16;* E04g *11/04*

U.S. Cl. 52—2 15 Claims

ABSTRACT OF THE DISCLOSURE

An improved building technique which utilizes a novel light-weight aero-trussed roof construction. The aero-trussed roof is embodied in one form in a stadium-type housing structure which encloses an arena area used for public entertainment. The housing structure includes spaced apart side wall which may have moveable roof sections of considerable magnitude and span adjustable on the side walls towards and away from one another to shelter or exposed the area as desired. The aero-trussed roof sections whether moveable or stationary are comprised by reinforced gas-filled bodies which are inflated from a suitable gas supply within the structure and novel power driven carriage means may be provided, where moveable roof sections are used, for rapidly advancing or retracting the gas-inflated sections in a position for sheltering or exposing the enclosed arena area as may be required.

This invention relates to an improved building construction having a prefabricated aero-trussed roof body. The term "aero-trussed" as hereinafter used in the specifications is intended to mean and to include roof structures or other structures in which confined volumes of gas are contained under pressure in trussed relation to serve the purpose of conventional beams and other frame members. In one specific aspect, the invention relates to a method and apparatus for housing an arena are used for public entertainment. In particular the invention is concerned with a novel stadium-type structure having side walls and moveable roof sections which can be advanced in a position to shelter arena area and which can be readily retracted over the side wall sections to expose the said area to an open atmosphere when weather conditions make such exposure desirable.

In accordance with the invention, the gas filled aero-trussed bodies formed into one or more sections, of either stationary or moveable type, may be utilized in connection with a wide range of building construction such as factories, assembly plants, office buildings, warehouses, hangers, shipbuilding sites and the like. However, the invention in one preferred embodiment is concerned with stadium-type structures. The term "stadium-type structure" as hereinafter used in the specifications is intended to refer generally to a multi-purpose structure which not only encloses an arena area used for public entertainment and having tiers of seats, but which may also have other housing spaces such as garages, offices and the like included herein.

Various problems are encountered in designing a moveable roof structure of the general class indicated, and at the same time providing an enclosed sheltered area of the order of magnitude indicated. A number of truss and movable shell type roof structures have been proposed, but these have not been found to be practical up to the present time. In order that a rigid structure of the required size be strong enough to sustain itself throughout a span, for example, of 650 feet or more, it must necessarily have considerable weight. Rigid members transmitting loads of great magnitude applied to any practical form of moveable carriage make it difficult to provide a satisfactory arrangement which will be easily durable to function over extended periods of time.

It is therefore a chief object of the invention to improve building construction and to devise a construction for one or more pre-fabricated roof sections which are formed from aero-trussed bodies, and which may be used in construction of sheltering or housing structures.

Another object of the invention is to improve methods and apparatus for housing an arena area used for public entertainment and to generally provide a novel stadium-type housing structure which has a high strength factor and which is readily producable in a range of sizes to provide stadiums of varying sizes for cities and towns in different regions throughout a country.

Another object of the invention is to provide a stadium type structure which surrounds the arena area and includes vertical wall sections of either permanent or pre-fabricated wall components capable of being joined together or separated from one another and occurring in various sizes to alter the type of the enclosed area and to facilitate the erection of the structure when desired.

Another object of the invention is to provide one or more moveable roof sections which can be supported in a practical manner at the top of vertical wall sections of the stadium-like structure and when so desired located in a position to efficiently shelter the arena area in inclement weather.

Another object of the invention is to devise a method of efficiently and rapidly retracting one or more moveable roof sections along vertical wall sections of a stadium-type structure to fully expose an enclosed arena area used for public entertainment.

Still another object of the invention is to devise a moveable roof structure which can be constructed from a plurality of gas inflated tubular bodies reinforced and joined together to form aero-trussed sections occurring in a generally arched roof conformation.

And still another object of the invention is to provide moveable roof sections in a relatively large stadium-type structure wherein gas filled aero-trussed sections of arched conformation are associated together, reinforced and yieldable held to withstand stress loads of varying nature in all kinds of weather while maintaining a suitable degree of handling and maneuverability.

The nature of the invention and its other objects and novel features will be more fully understood and appreciated from the following description of the preferred embodiments of the invention selected for purposes of illustration and shown in the accompanying drawings, in which.

Figure 2:
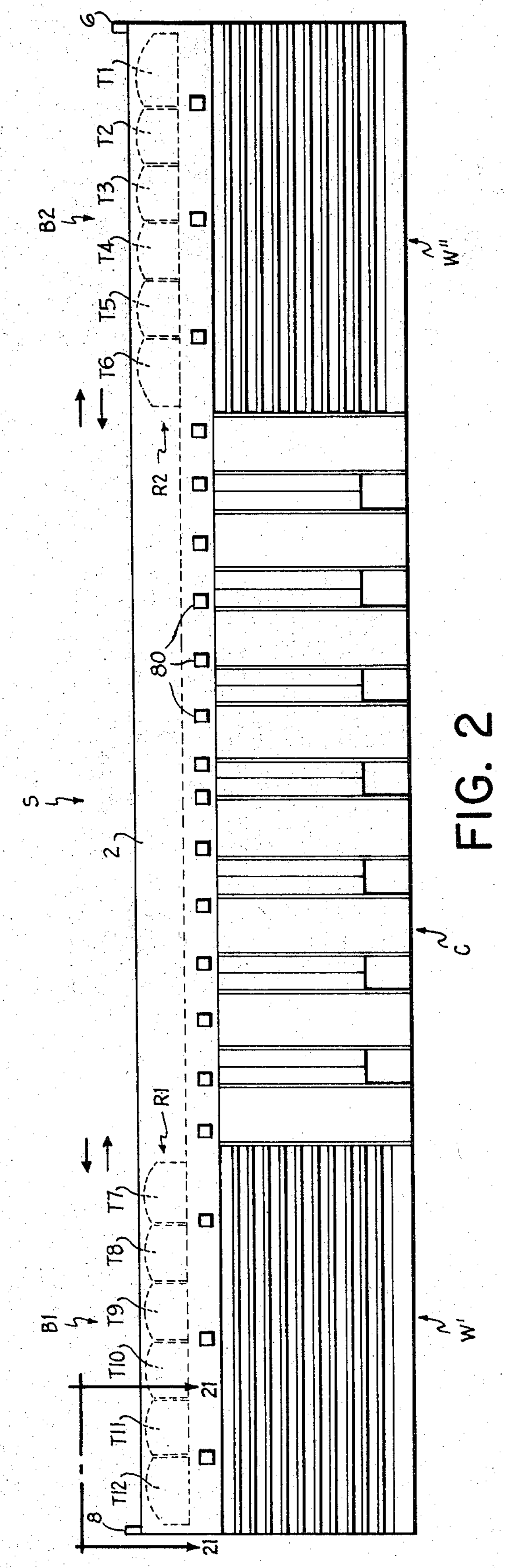
FIG. 2 is a side elevational view of the structure shown in FIG. 1.
Figure 3:
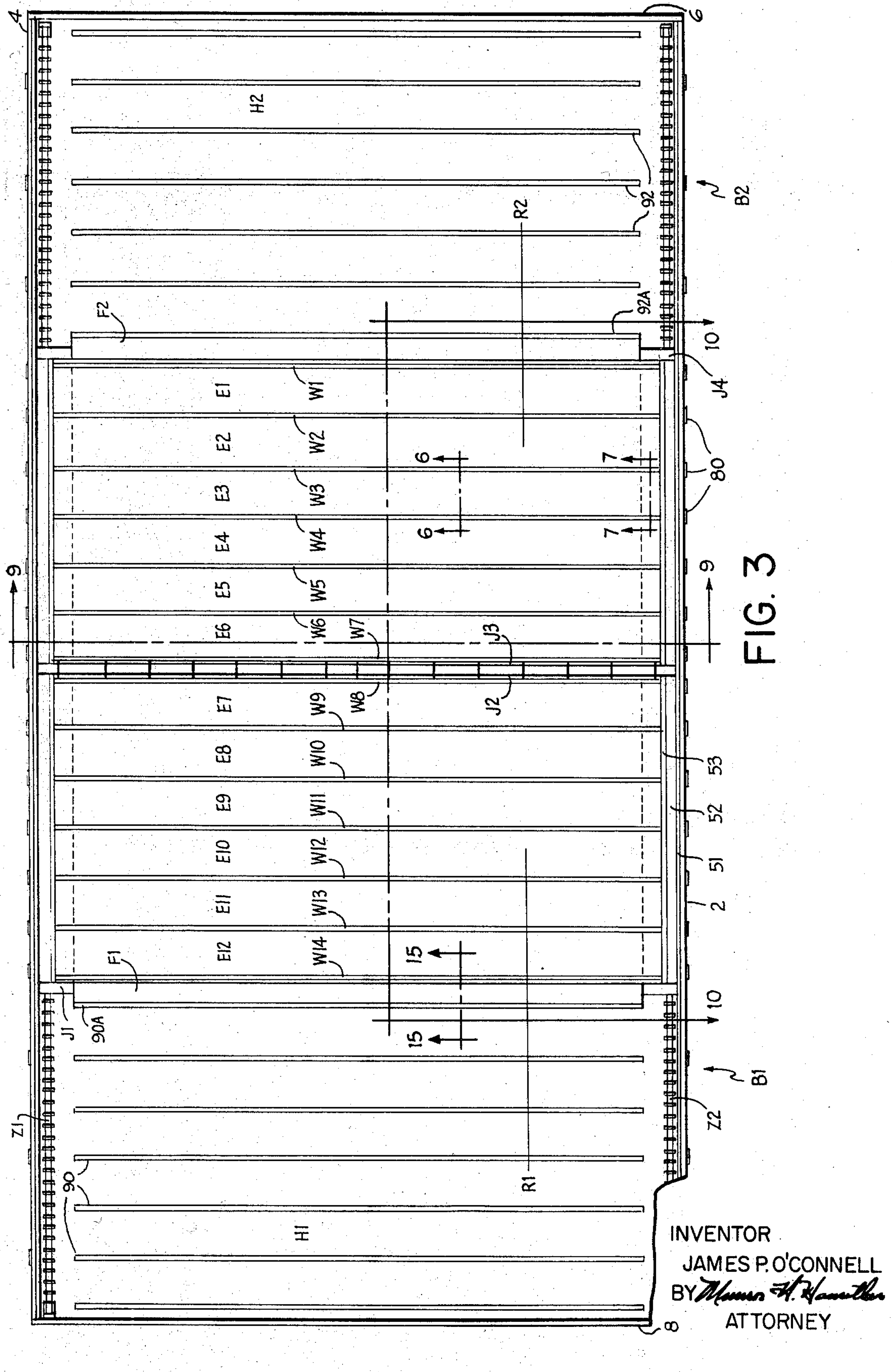
FIG. 3 is a plan view of the structure shown in FIGS. 1 and 2, and further indicating moveable gas inflated roof sections in a closed or sheltering position.
Figure 4:
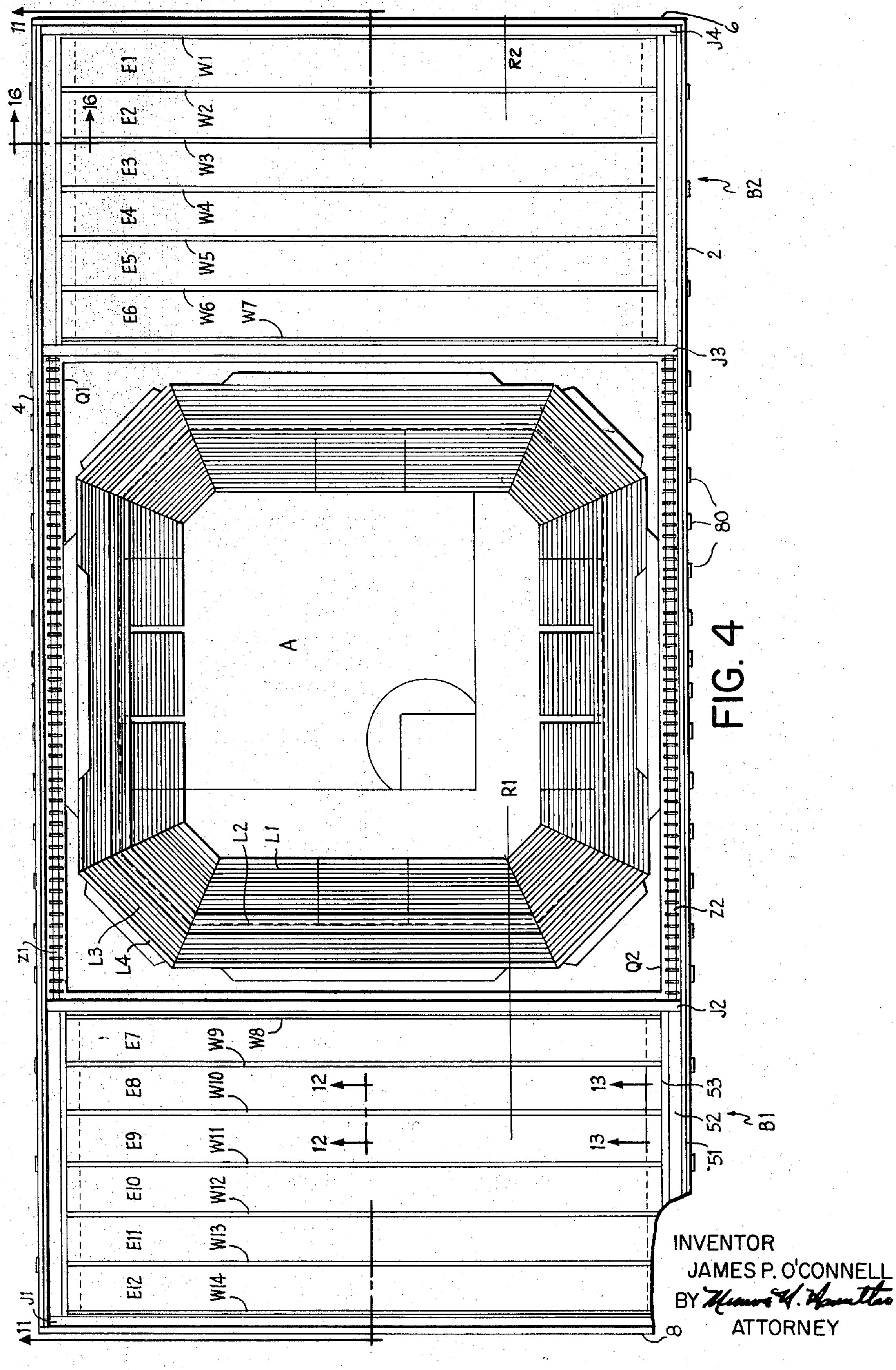
FIG. 4 is another plan view of the structure shown in FIGS. 1 and 2 but illustrates the movable gas-inflated roof sections retracted to expose an arena area to the open atmosphere.
Figure 5:
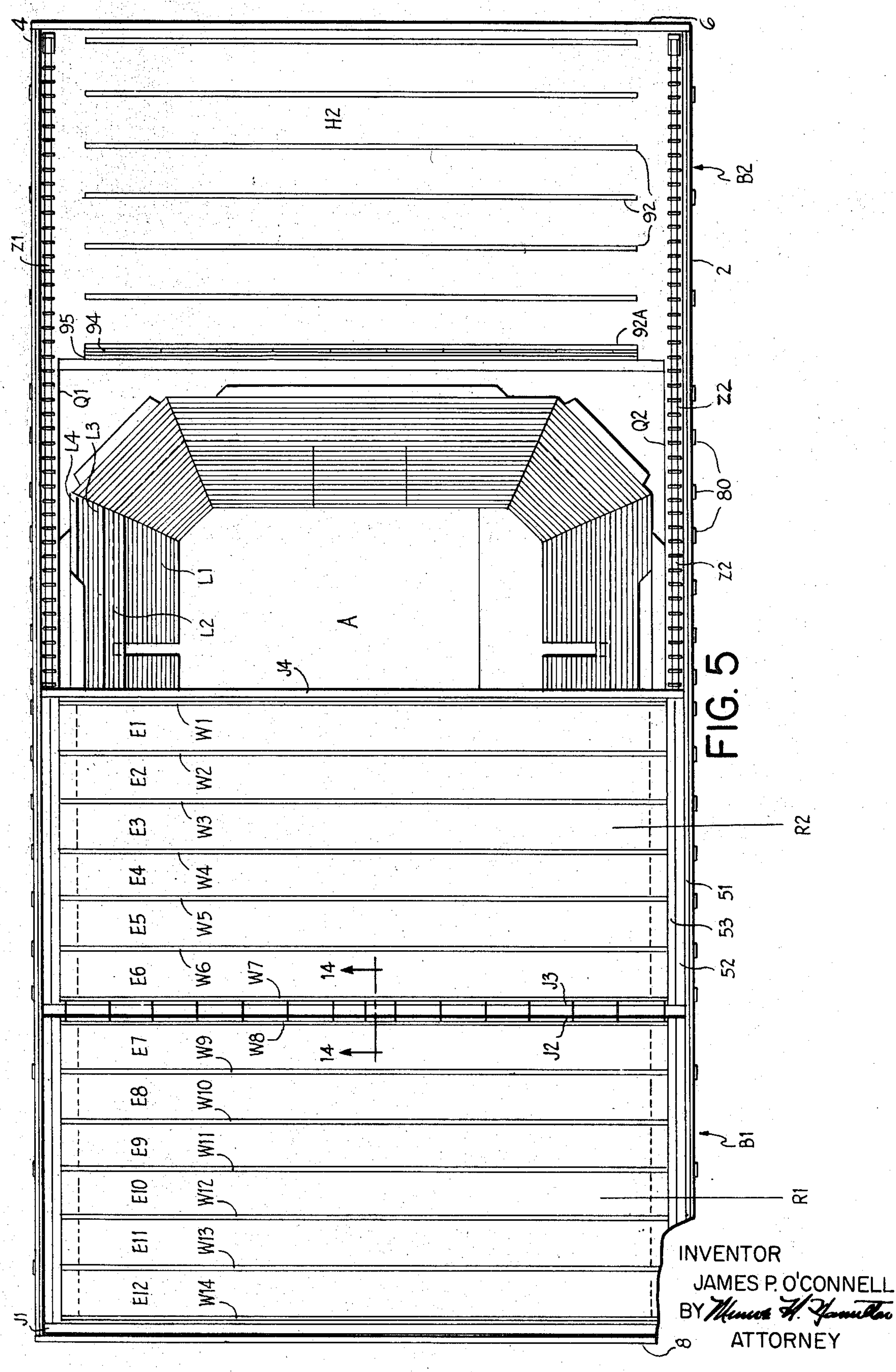
FIG. 5 is a plan view showing a step in repositioning one of the roof sections in a sheltering position.
Figure 12:
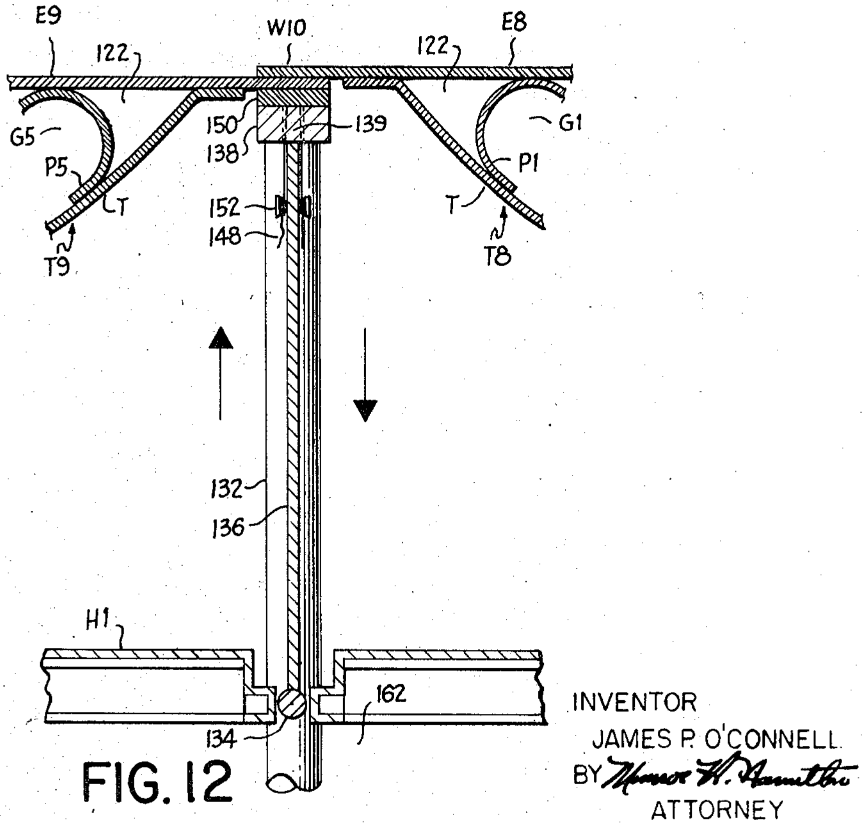
Figure 11:
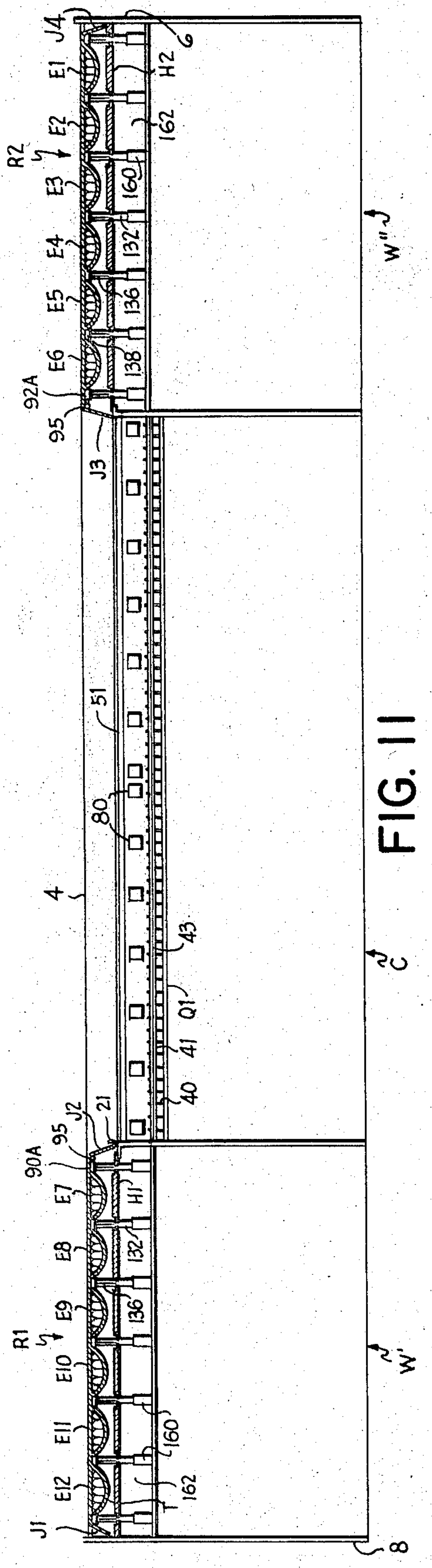
Figure 18:
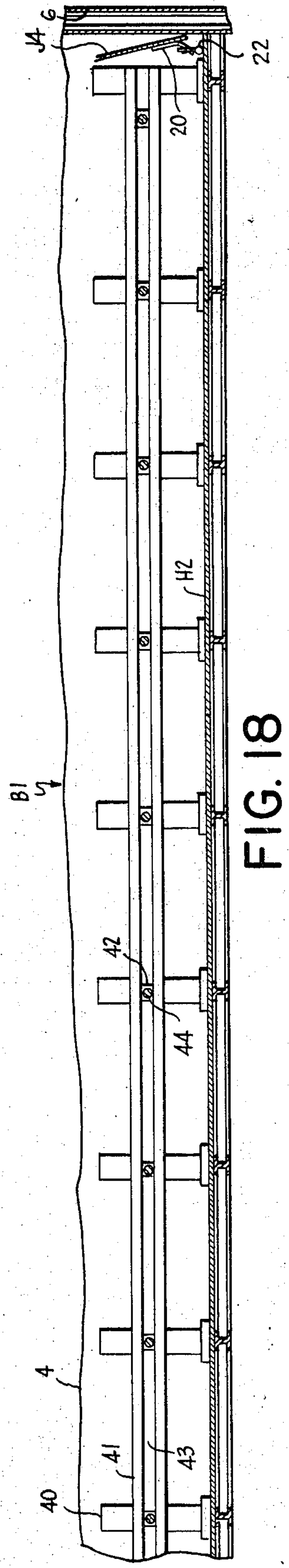
Figure 14:
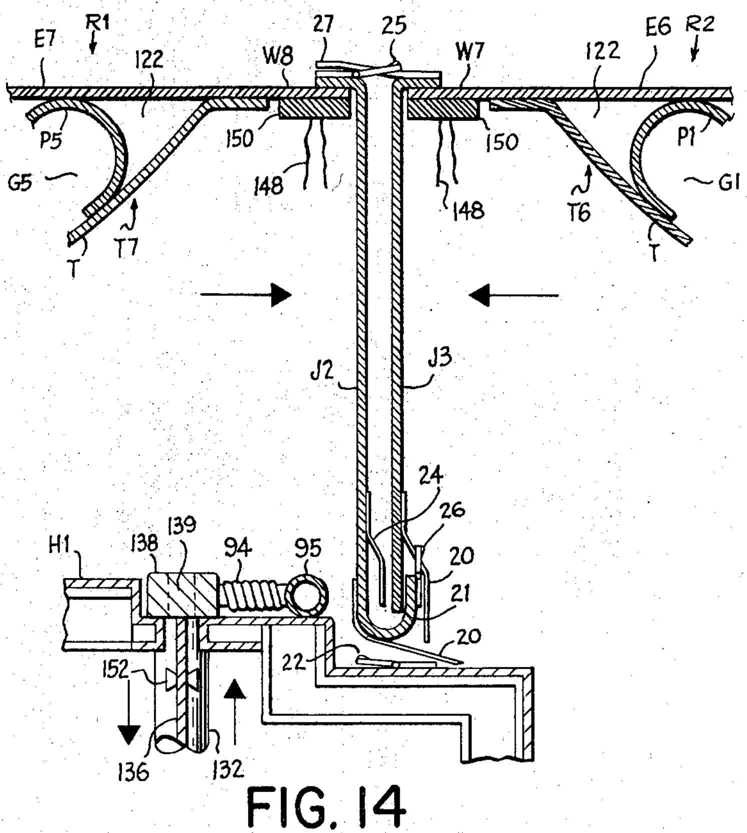
Figure 13:
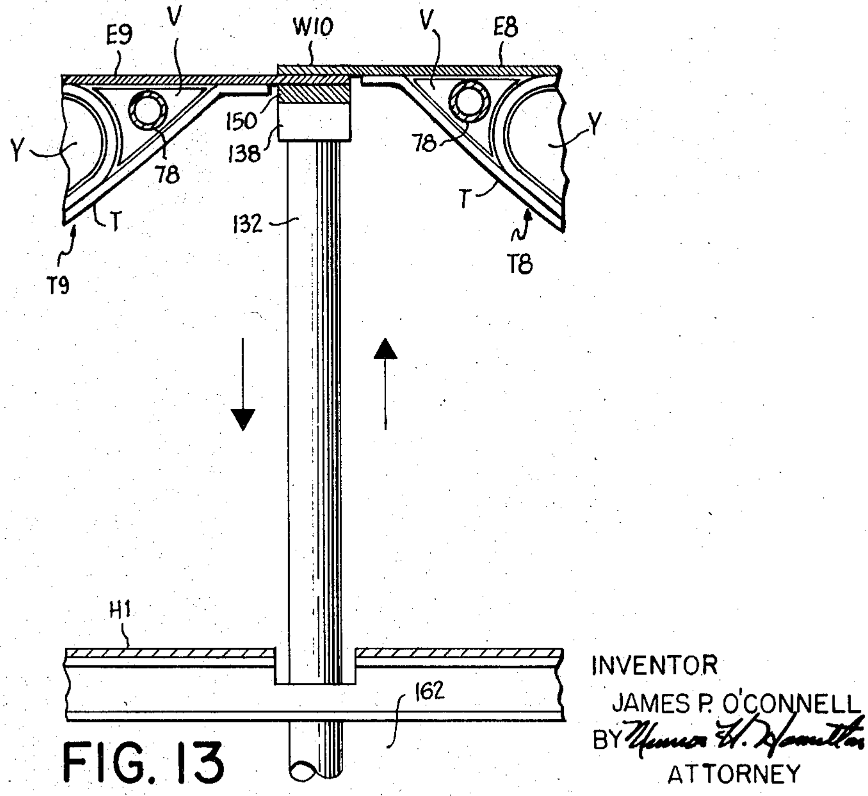
Figure 15:
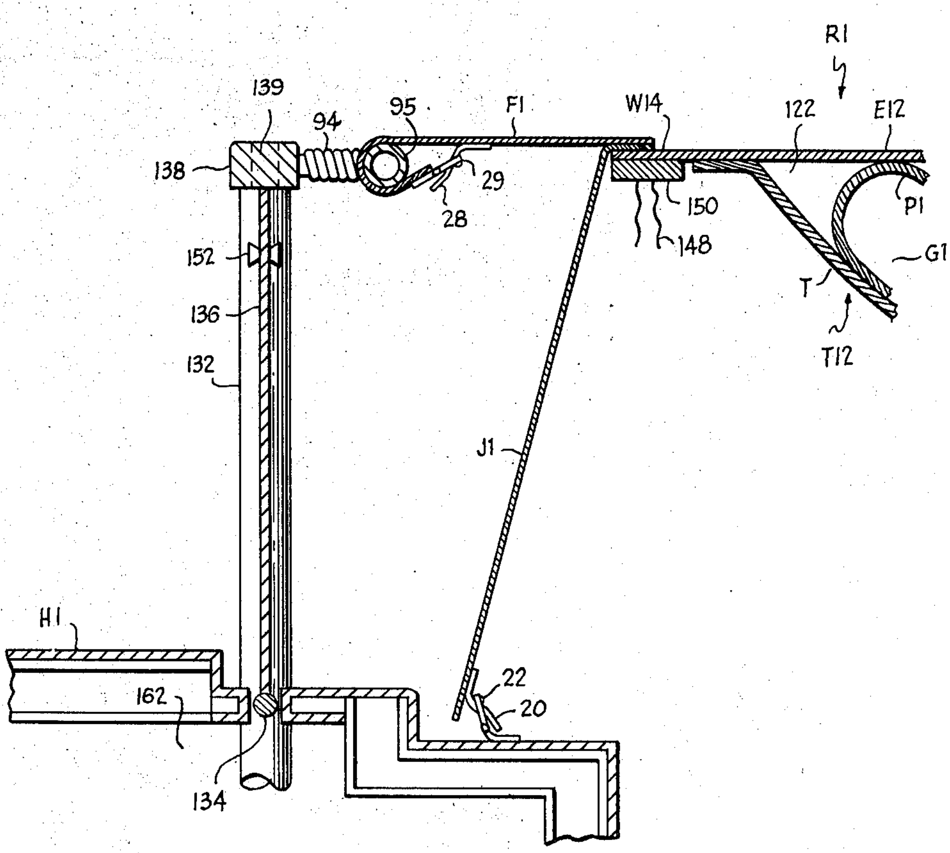
Figure 28:
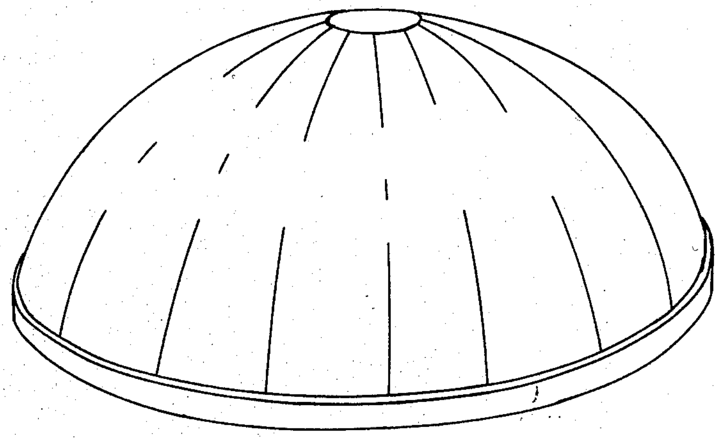
Figures 16, 17:
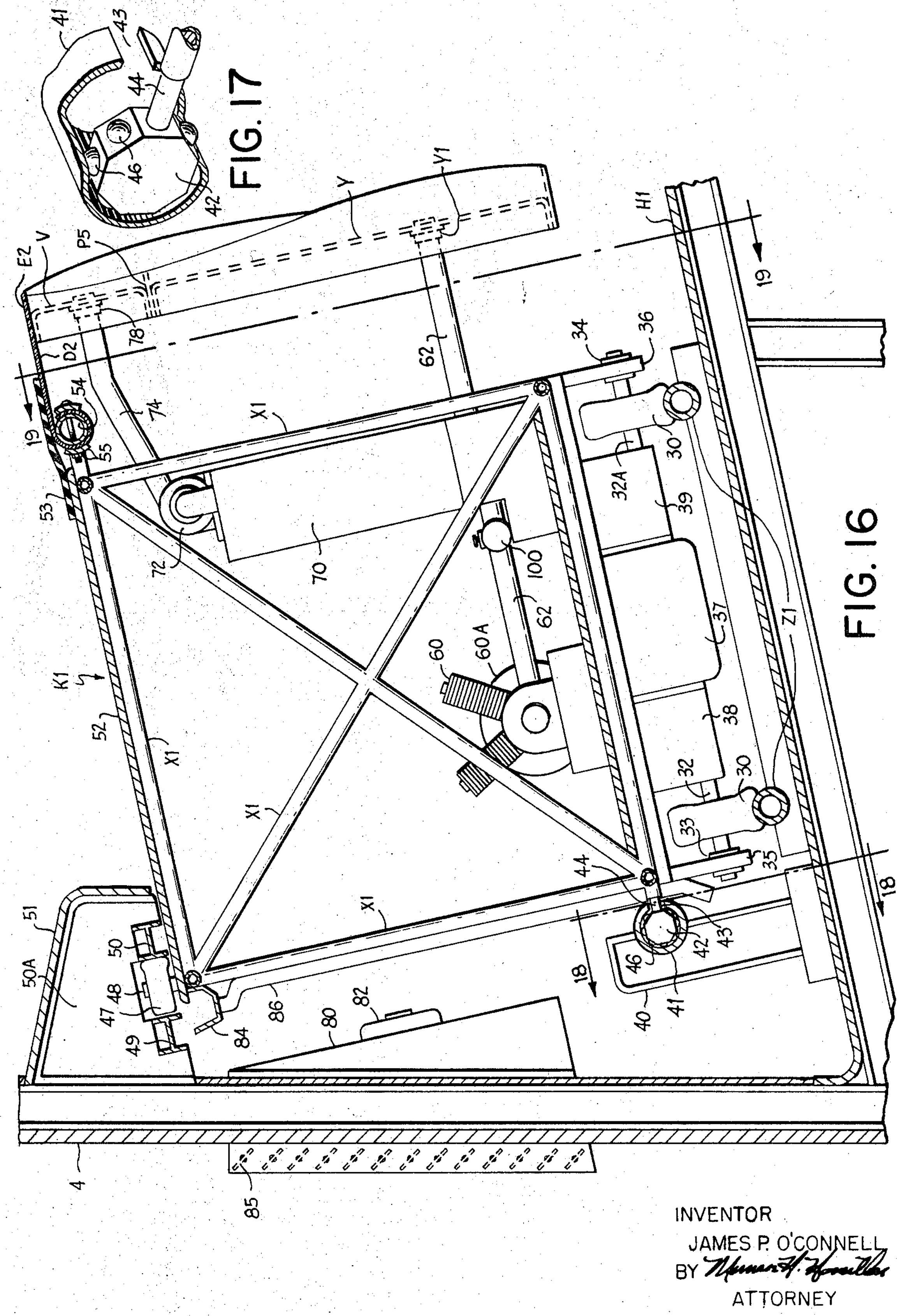
Figure 19:
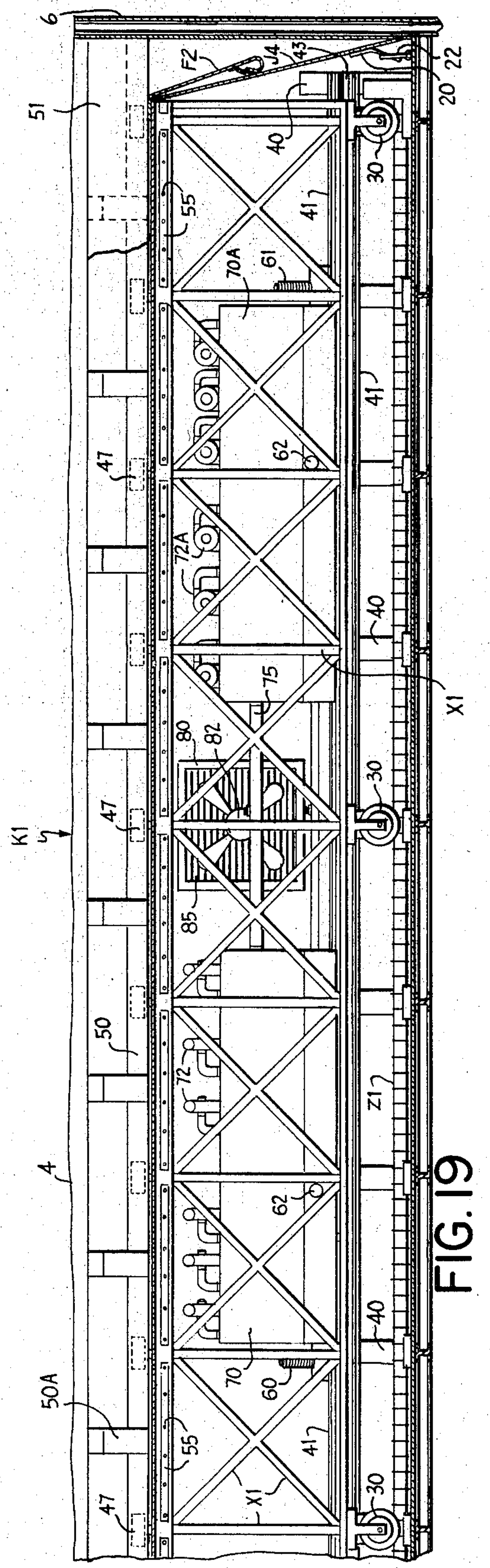
Figure 20:
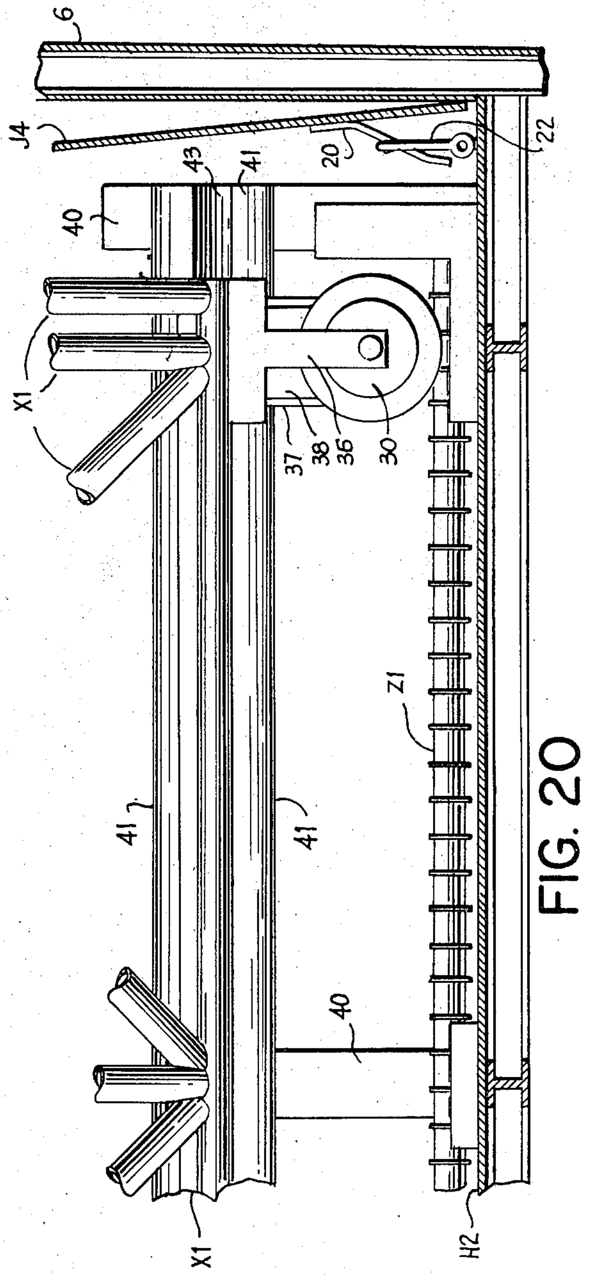
Figure 21:
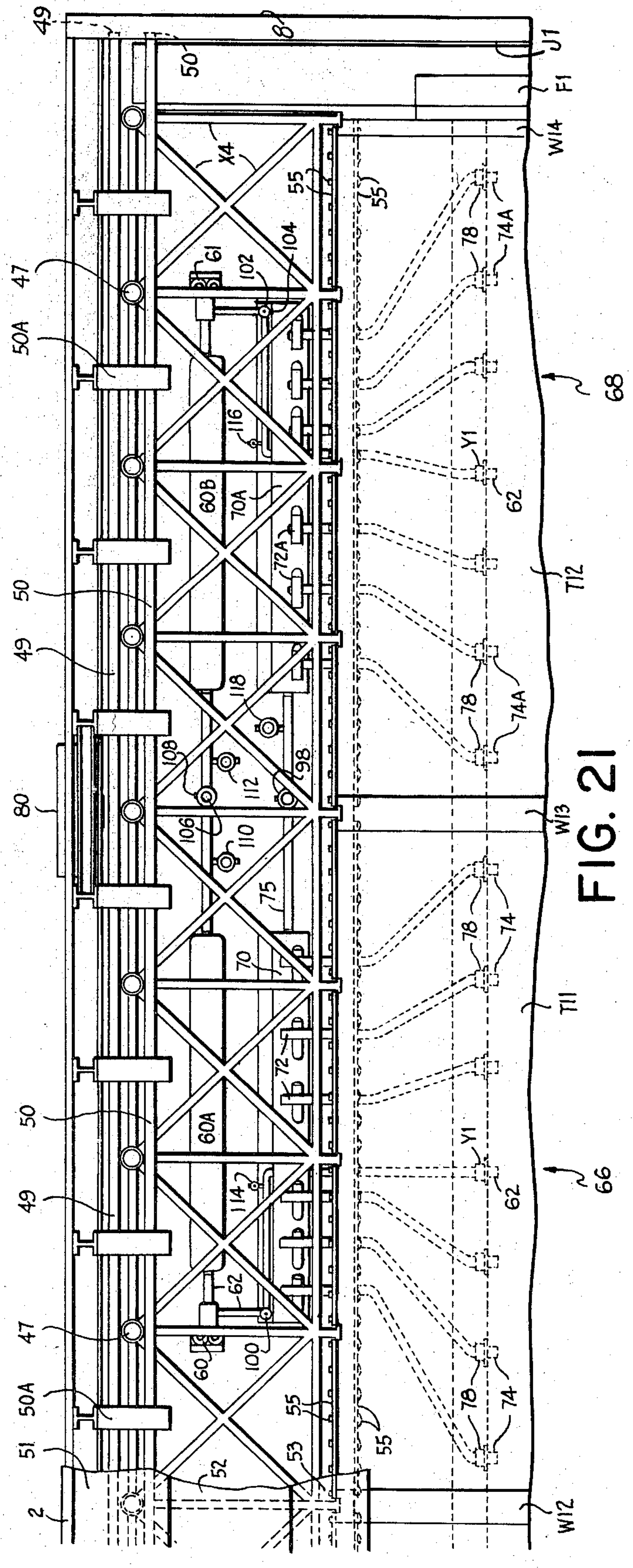
Figure 22:
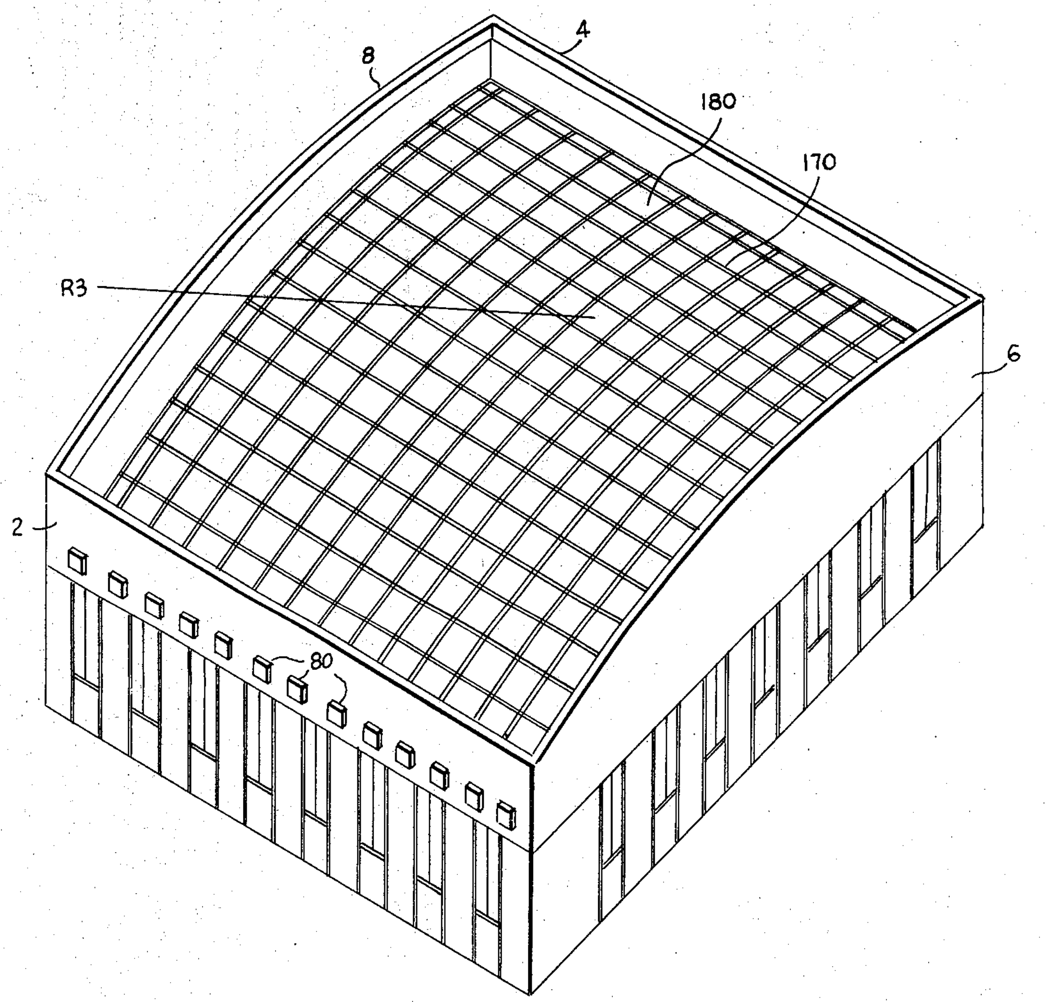
Figures 23, 24:
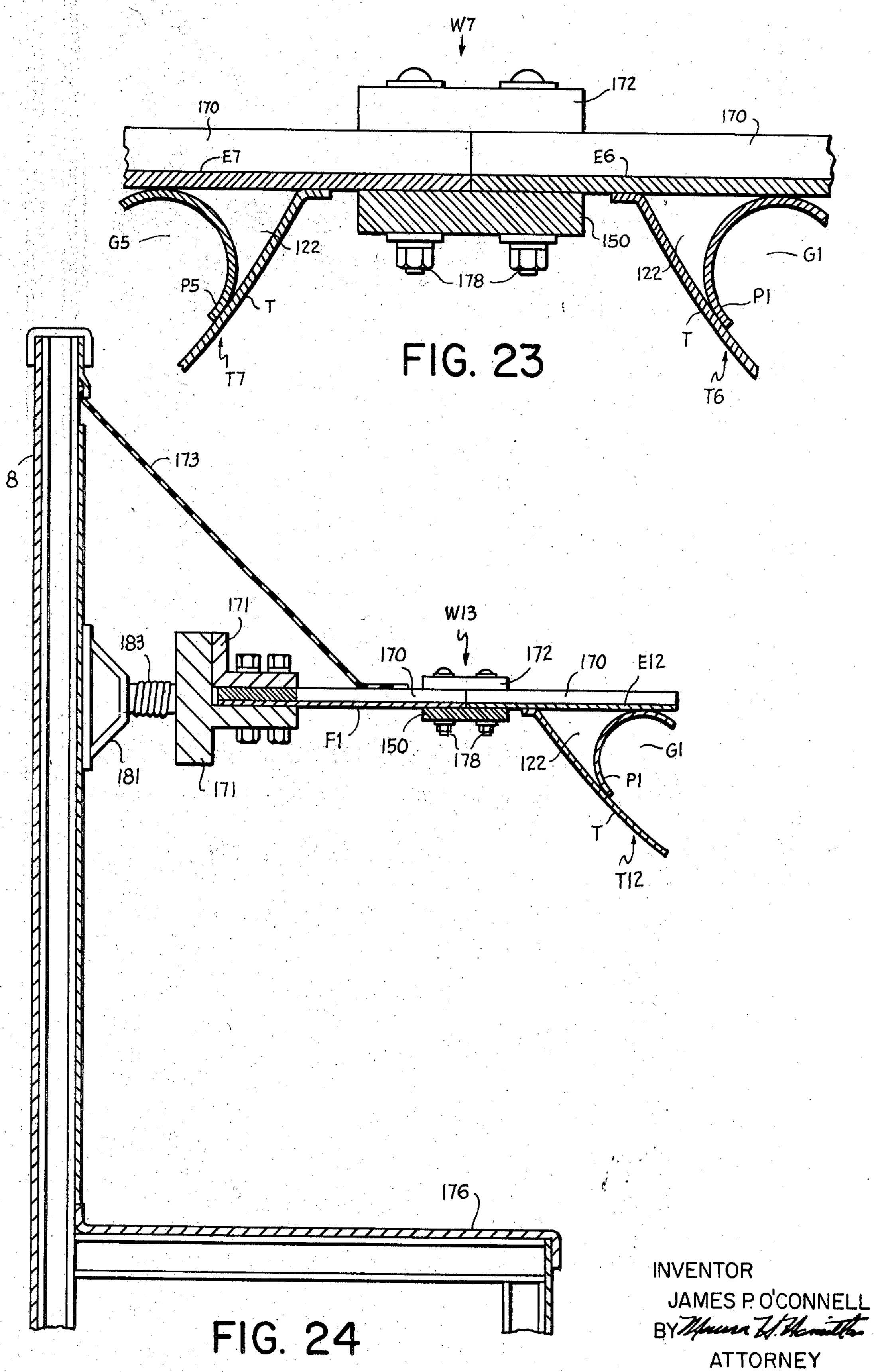
Figures 25, 29:
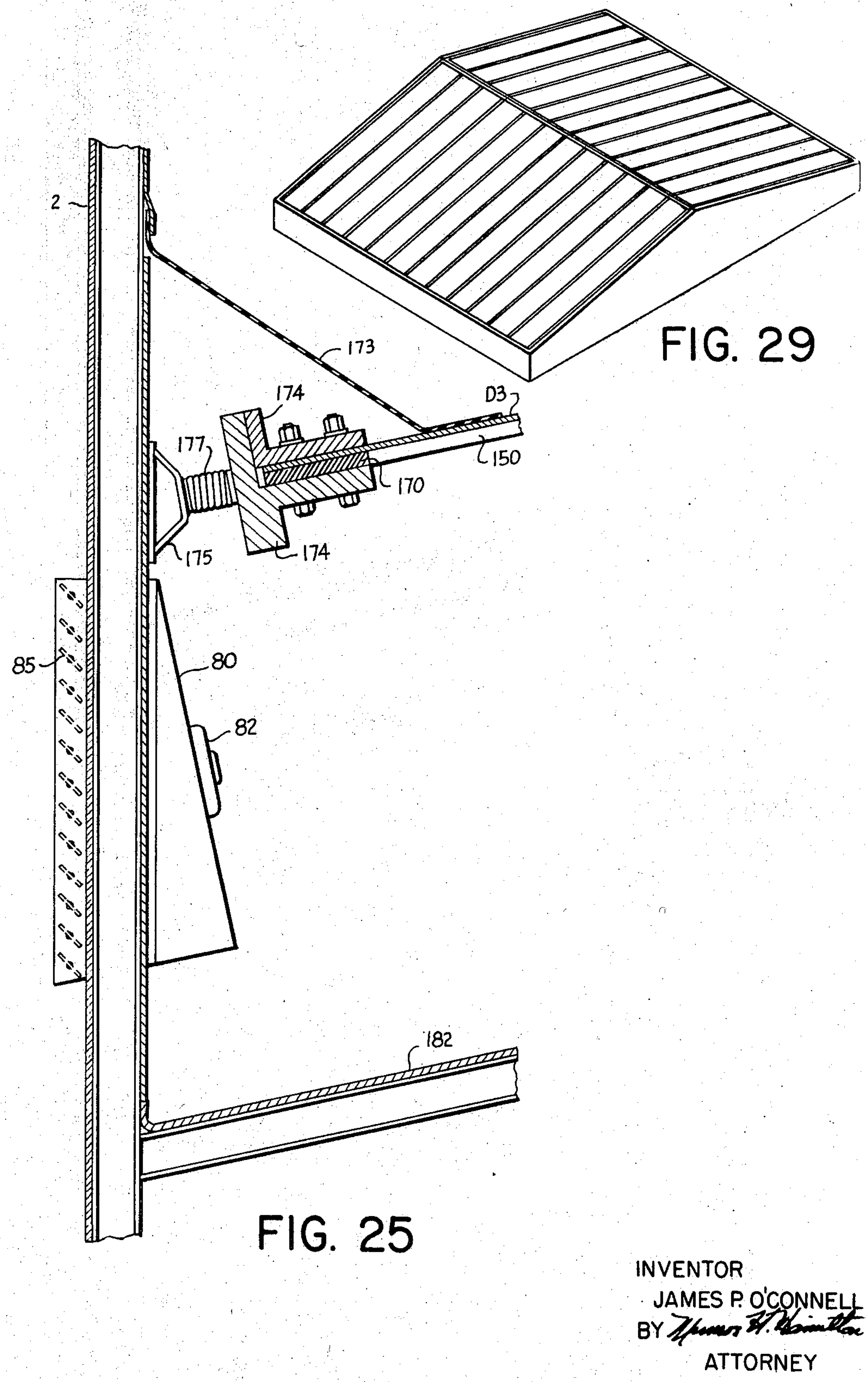
Figure 27:
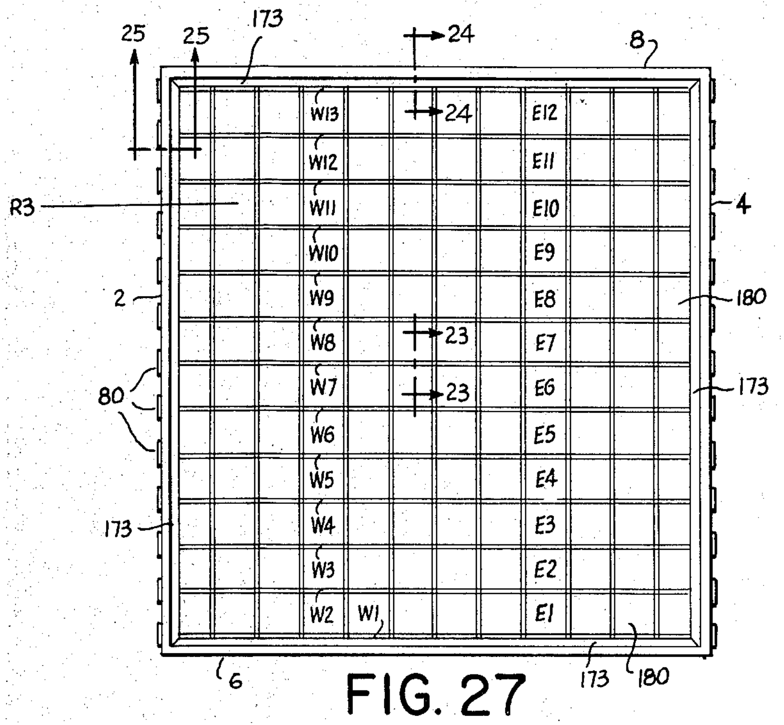
Figure 26:
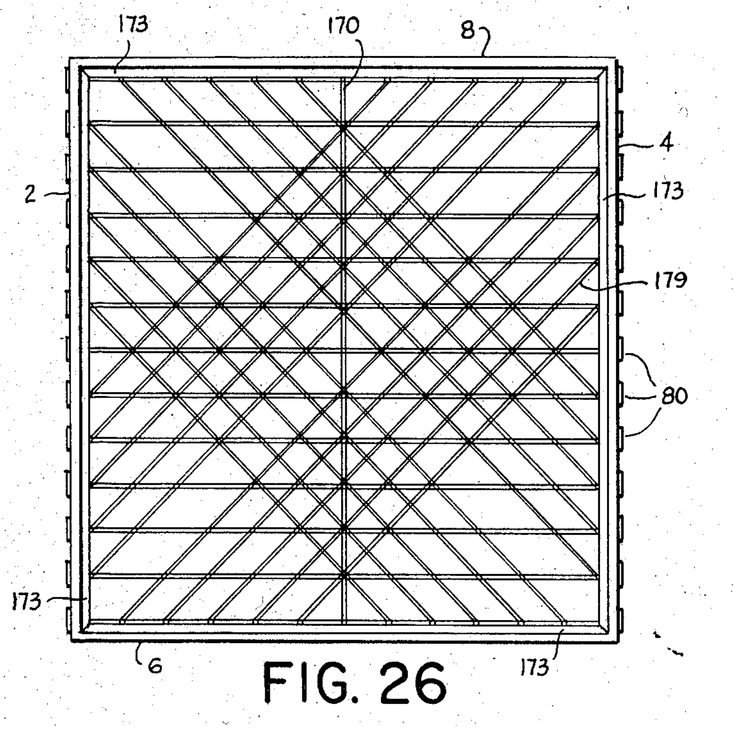

FGI. 10 is a detail cross sectional view taken on the line 10—10 in FIG. 3;

FIG. 11 is an enlarged detail sectional view taken on line 11—11 in FIG. 4;

FIG. 12 is a detail sectional view taken on the line 12—12 of FIG. 4;

FIG. 13 is a detail cross sectional view taken on the line 13—13 of FIG. 4;

FIG. 14 is a detail cross sectional view taken on the line 14—14 of FIG. 5;

FIG. 15 is a detail sectional view taken on line 15—15 of FIG. 3;

FIG. 16 is a detail cross sectional view taken on line 16—16 of FIG. 4;

FIG. 17 is a fragmentary detail perspective view of the bearing element shown in FIG. 16;

FIG. 18 is a fragmentary detail view of the bearing guide structure shown in FIG. 16 taken on line 18—18 of FIG. 16;

FIG. 19 is a detail view of the carriage structure shown in FIG. 16 taken approximately on line 19—19 of FIG. 16;

FIG. 20 is a fragmentary detail view of a portion of the carriage structure shown in FIG. 19;

FIG. 21 is a fragmentary detail plan view taken on line 21—21 in FIG. 2;

FIG. 22 is a perspective view illustrating a modified form of the invention;

FIG. 23 is a somewhat enlarged detail cross sectional view taken on line 23—23 of FIG. 27;

FIG. 24 is a detail cross sectional view taken on line 24—24 of FIG. 27;

FIG. 25 is a detail cross sectional view taken on line 25—25 of FIG. 27;

FIG. 26 is a plan view of a modified form of the invention;

FIG. 27 is a plan view of the structure shown in FIG. 22;

FIG. 28 is a perspective view of another modified form of the invention;

FIG. 29 is a perspective view of still another modified form of the invention;

The present invention is based on the novel concept of utilizing a structure made up of aero-trussed bodies to protectively house an enclosed area. In a preferred embodiment, the invention is concerned with an area to be used for public entertainment and in this instance the method of housing consists in pre-forming roof sections comprising aero-trussed bodies, mounting the roof sections above a supporting base in a normally retracted position and horizontally moveable carriage means, inflating the aero-trussed bodies to form arched roof portions and selectively moving the roof sections while in an arched position into a sheltering position with respect to an open area enclosed within the supporting base.

In carrying out the concept of moving one or more separate roof sections of a closure apparatus, I may desire to provide roof sections of differing types of construction, and I may especially desire to move two or more roof sections in any one of several different ways. For example, I may provide two roof sections and move both sections simultaneously, and I may provide for automatically causing the sections to become locked when they reach a fully advanced sheltering position. In another desirable method of the invention, I may provide two gas-inflatted tubular type roof sections and the two roof sections may be moved in a manner such that one section is held stationary while the second roof section is moved into interlocking relationship with the first, as indicated in FIGS. 5 and 14, and thereafter both sections may be travelled into a position to completely shelter the playing area A and stands L1, L2, L3 and L4. The invention in one preferred embodiment is hereinafter described with reference to the gas inflated roof sections as noted above, but it should be understood that this embodiment is not to be taken in a limiting sense, and I may vary the construction of the roof sections and change the sequence of travel of components and I may also modify the manner in which the roof sections are interlocked with one another in various ways.

Figure 1:
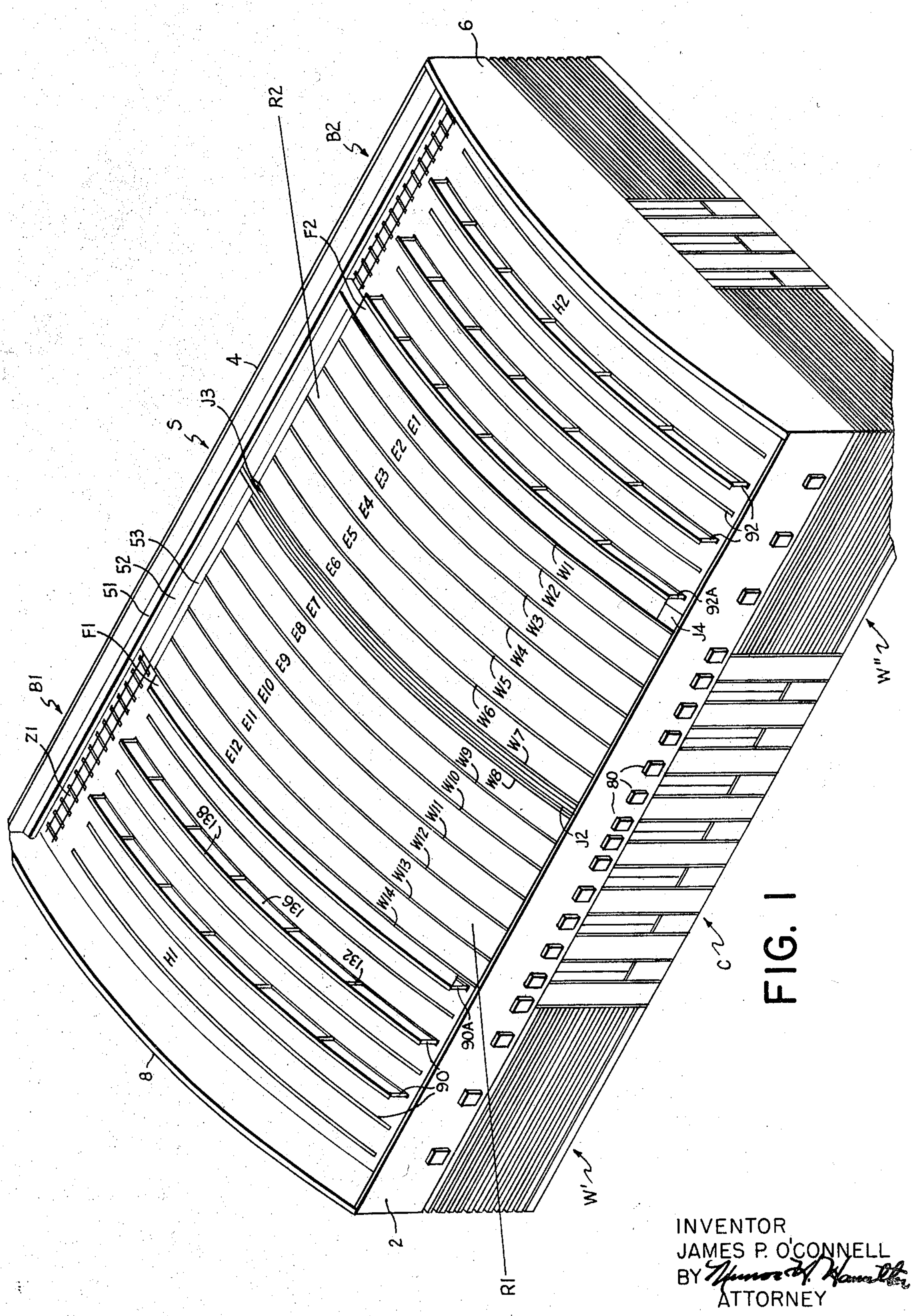
FIG. 1 is a perspective view showing the stadium-type structure of the invention with two moveable roof sections.

Considering in general the parts illustrated in the drawings and which I find may be employed to carry out one preferred form of the method of the invention, there is included a stadium-type structure S which encloses an area A and the said stands to be used for public entertainment. As shown in more detail in FIGS. 1–5 the stadium-type structure S in a preferred form is made up of a front side 2, a rear side 4, and two ends 6 and 8. These stadium sides define a rectangularly shaped enclosure section surrounding the area A and stand portions and two wing sections extending outwardly from either side of the central enclosure section. The arrangement of these enclosure sections is best seen in FIGS. 1 and 2 and in these figures the central section is denoted by the reference character C and the wing sections are denoted by reference characters W′ and W″.

Figures 9, 10:
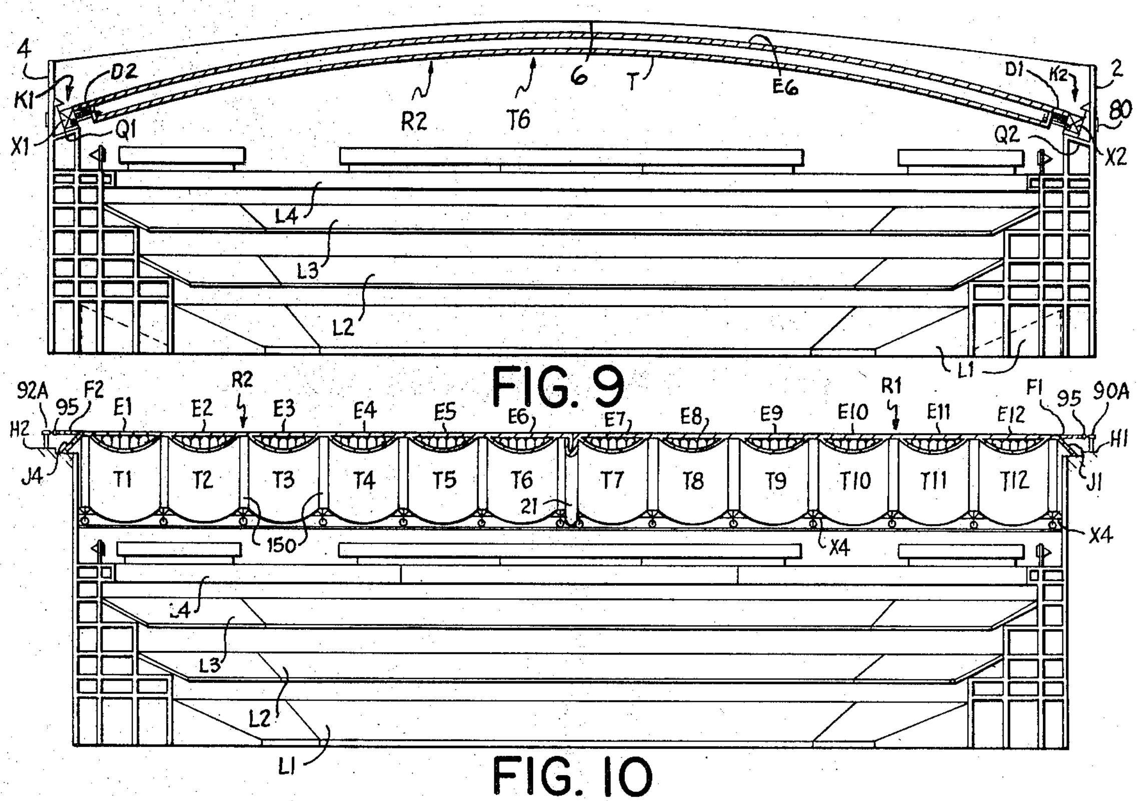
FIG. 9 is a transverse cross sectional view taken on line 9—9 of FIG. 3.

It will be understood that the three stadium sections C, W′ and W″ are intended to be illustrative of various other desirable arrangements and it is also pointed out that the functions and purposes of the parts may vary greately in accordance with specific requirements. However, in one preferred arrangement it is intended that this area A may be of a size suitable for constituting a playing area for sports such as baseball as suggested in FIG. 4 or various other activities such as football, basketball, boxing and the like, and the central section C will provide entrance ways to the stadium and seating facilities on four sides of playing area A for those attending events. As illustrative of one suitable seating arrangement, there is shown in FIG. 9 tiers of stands including a first level L1 and second level L2 and a third level L3 and a fourth level L4.

It is further intended that the wings W′ and W″ preferably are to constitute garages for providing adequate parking facilities for cars of those attending stadium events. For these indicated purposes, it is contemplated that the overall structure may have a width of from 600–800 feet and a length of about 1200–1500 feet, and in this range of sizes there may be provided, in conjunction with the wing sections W′ and W″ various other housing functions for business establishments such as stores, offices, resetaurants and the like.

The method of the invention is carried out by superimposing on the stadium structure indicated, a unique arched-type sheltering or enclosure apparatus preferably having a pair of moveable arched roof sections R1 and R2 which can be selectively controlled. Along the top of the stadium S are formed two spaced apart bays B1 and B2 in which the moveable roof sections are contained in normally retracted positions above and at either side of the playing area A. Each of the moveable roof sections as hereinafter described in detail is made up of aero-trussed tubular arches which support exterior covering sheets of material suitable for exposure to varying weather conditions.

Also provided as a part of the closure apparatus are roof section carriage means for travelling the roof sections R1 and R2 in and out of the bays B1 and B2, and various other related parts consisting of vertically reciprocating cradle means for supporting the roof sections in retracted positions in their respective bays; power driving means for advancing the carriage means, wind deflecting panel means combined with the cradle means, devices for furnishing gas to the tubular arches, heating means and special fastening devices for securing the roof sections in desired positions of adjustment.

In accordance with the invention, the concept of utilizing a selectively controlled closure apparatus, comprising one or more moveable roof sections, may I find be implemented in one practical form by forming the arched roof sections from gas inflated tubular arches. I have found that such gas inflated tubular arches can be joined together in festooned relationship to constitute in effect a series of connected aero-trussed bodies for supporting an exterior covering sheet of material suitable for exposure to various weather conditions. I have still further determined that such aero-trussed tubular arches when combined with the covering sheet material in festooned relationship and when suitably pressurized is capable of providing a relatively light weight framework characterized by a high degree of strength and rigidity which enables this arched framework to extend over and span the very substantial area encompassed by a sports arena or playing field such as the playing field A and stands L1, L2, L3 and L4 described above.

In FIGS. 1–5 inclusive the roof sections R1 and R2 comprised by the aero-trussed arches and covering materials are generally indicated and a more detailed showing of one desirable form of multiple arch construction is present in FIGS. 6, 7, 8, 10 and 11.

As will be observed from an inspection of FIG. 9 the tubular arches and covering material in each of the roof sections R1 and R2 constitute sheltering bodies which curve upwardly between the front side 2 and rear side 4 of the stadium S. The two roof sections as noted in FIG. 1 are of a combined length suitable for completely overlying the area A and stands L1, L2, L3 and L4 when advanced out of their respective bays.

In FIG. 10 I have illustrated each roof section made up of six aero-trussed arches T each of which encompasses gas filled bodies indicated by the reference characters T1, T2, T3, T4, T5 and T6 in section R2; and by reference characters T7, T8, T9, T10, T11 and T12 in section R1. I may however desire to employ a greater or lesser number of the aero-trussed arches as required.

Figure 7:
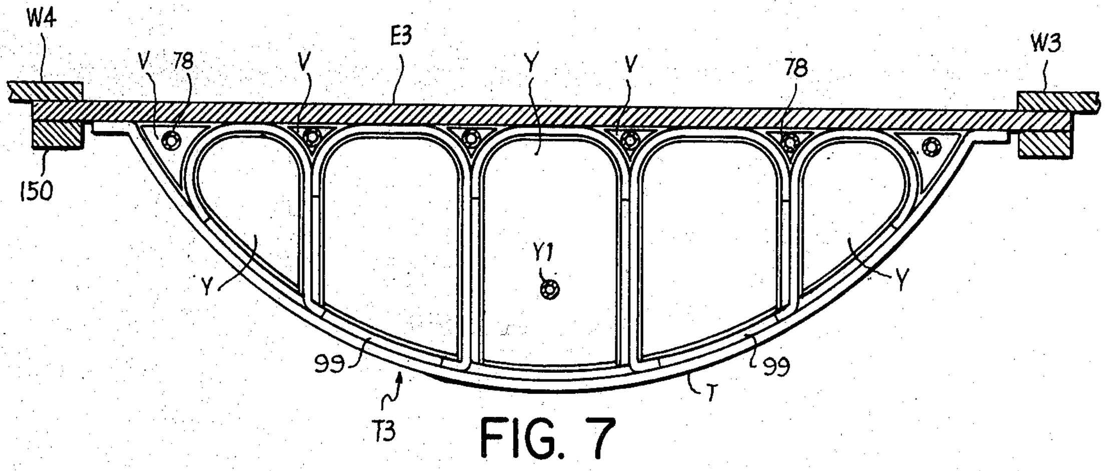
FIG. 7 is a greatly enlarged detail cross sectional view similar to FIG. 6 but taken on the line 7—7 of FIG. 3.
Figure 6:
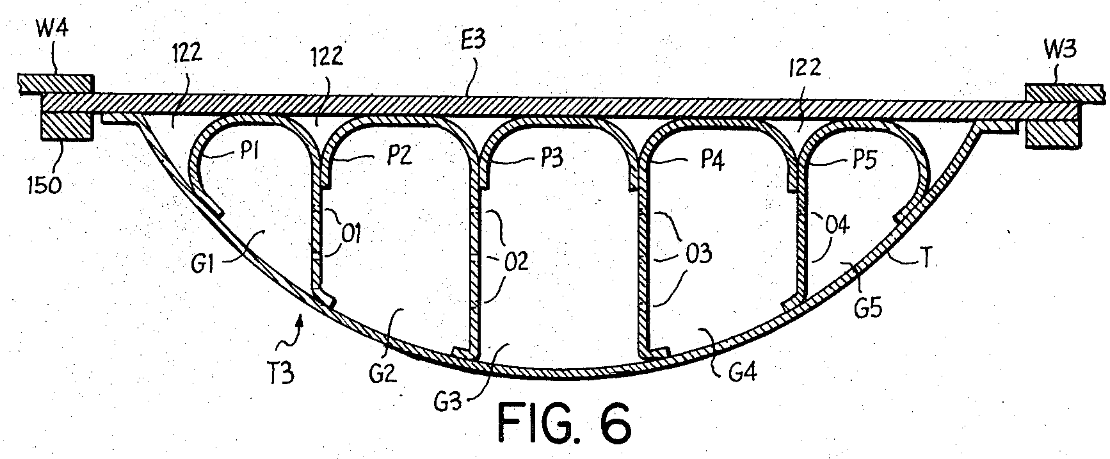
FIG. 6 is a greatly enlarged sectional view taken along the line 6—6 in FIG. 3 showing details of construction of an aero-trussed roof section.
Figure 8:
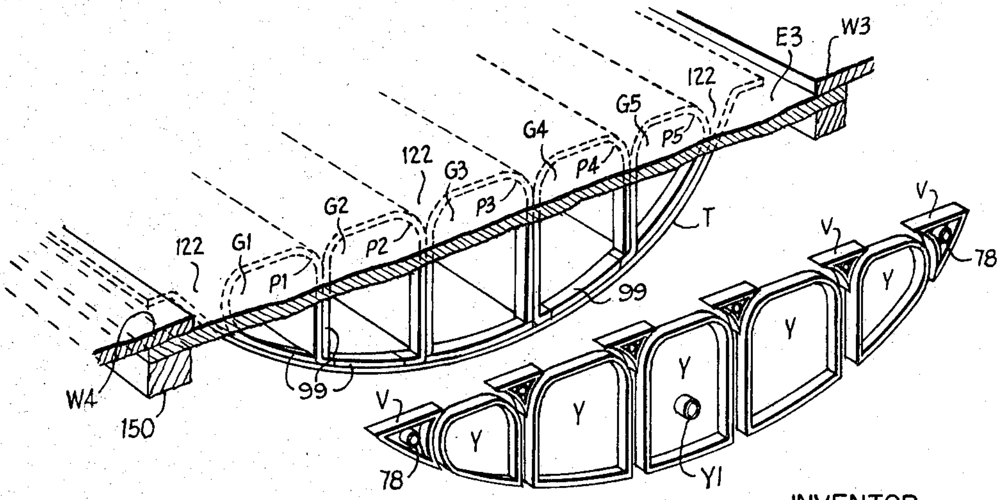
FIG. 8 is an exploded perspective view of the parts shown in FIG. 7.

In FIGS. 6, 7 and 8 a detail of construction of these parts are shown, and as noted therein the aero-trussed arch member T is secured at the underside of exterior covering section E3 in festooned relationship and forms together with interconnecting partition members an elongated gas retaining body T3 which can be inflated to form a relatively rigid arcuate aero-trussed body.

It will be noted in FIGS. 7 and 8 that the extremities of such aero-trussed bodies are selectively closed by a plurality of end caps Y, the middle one of which has formed therein an access port Y1 for connection with helium gas conduit means 62 as hereinafter described in detail. It will also be noted that to assist in the fitting of these end caps within such extremities there has been provided a plurality of filler strips 99.

As is further shown in FIGS. 6, 7 and 8, each of the aero-trussed bodies is preferably fabricated from a plurality of sheet materials to from a number of partitions P1, P2, P3, P4 and P5 which are separately attached and hermetically sealed to one another to the said arch member T, and to the exterior covering section to form a plurality of gas compartments, G1, G2, G3, G4 and G5 which are in communication with one another through openings 01, 02, 03, 04 and which are designed to be inflated under pressure by means of a low density gas such as helium.

It will be noted in FIGS. 6, 7 and 8 that the partitions P1, P2, P3, P4 and P5 in making attachment with the underside of the exterior covering section E3 forms a plurality of triangular shaped compartments, called thermal ducts 122, the extremities of which are closed by a second set of end caps V, in each of which access ports are formed for connection with thermal conduit means 74 and 74A as described hereinafter in detail.

While FIGS. 6, 7 and 8 show the aero-trussed bodies to be somewhat elliptical in their cross sectional configuration, it is to be understood that this invention is not limited to aero-trussed structures having such cross sectional configuration. It is to be understood further that this invention is not limited to aero-trussed structures having the aforesaid number of gas compartments, thermal ducts or partitions; nor is it limited to structures in which the said partitions are disposed and attached in the manner shown in FIG. 6, or which require said openings for communication formed therein.

As is shown in FIG. 16 the exterior covering sections are also extended along two sides to provide retaining ends which are utilized for securing the roof sections R1 and R2 as described below. These retaining ends are generally denoted by reference characters D1 and D2 (FIG. 9). Along the two other sides of each roof section the exterior covering sections are formed with fastening extensions F1 and F2 as shown in FIGS. 1, 3, 10 and 15.

While the novel concept of using gas inflated arches as truss means is not intended to be limited to the detailed fabrication noted above, it should be observed that important functions and desirable advantages may be realized from the association of the parts described. For example, it is pointed out that regard must be had for supporting the moveable roof sections R1 and R2 on suitable carriage means. The overall exterior covering sections must be reinforced as much as possible to withstand exposure and handling. There is required to be available means for securing the roof sections in both advanced and retracted positions of adjustment. There is also a desirability for locating the roof sections in such relative positions that they are accessible for maintenance and repairs from time to time.

It is with these considerations in mind that the concept of using aero-trussed arches in two separate roof sections has evolved with each of the roof sections being contained in separate bays where they are readily accessible and where they may be contained in a supported relationship on cradle structures.

The aero-trussed arches in the preferred form shown, are separately fabricated to provide isolated aero-trussed bodies, any one of which can be separately serviced, maintained or replaced without interfering with the operation of other tubular arch portions. The multi-cell arrangement operates to resist any appreciable loss of gas in the event of damage or destruction of any one of the arches.

It will also be seen that by incorporating a plurality of partitions in each tubular arch a novel supporting effect is achieved, clearly stiffening each arch and enabling each arch to support respective exterior cover sections more efficiently. It will do this, in part, by exercising a flattening effect upon the said exterior cover sections.

These exterior covering sections are also strengthened in their collective aspect by reinforcing members, called web braces 150, which underlie the web strip portions, W1 through W14, which define the line of joinder of adjacent aero-trussed bodies; including the line of joinder of covering sections E1, E6, E7 and E12 with the end curtains J1, J2, J3 and J4 respective to them, as shown in FIG. 1. FIGS. 12, 13 and 14 illustrate in detail the manner in which juncture between the aforesaid parts is accomplished.

These web braces 150 may also be designed to provide bearing areas which may be employed in a novel manner to support the roof sections R1 and R2 in special cradle structures in respective bays B1 and B2 when the roof sections are in retracted position and the cradle structures are employed as hereafter described, as shown in FIGS. 12 and 13.

The herein described aero-trussed arch members T, the partition portions, the end caps Y and V and the exterior covering sections may be composed of some suitable sheeting material of single or multiply construction which is impervious to the passage of a low density gas such as helium, and which is suitably durable in all kinds of weather. The roof section end curtains J1, J2, J3 and J4, and the fastening extensions F1 and F2, shown in FIG. 11, may be made of similar materials, but which need not be impervious to the passage of helium gas.

Attachment together of those sheeting materials which form the said gas compartments G1, G2, G3, G4, G5, and thermal ducts 122 and their end caps Y and V may be accomplished by some suitable means such as stitching, riveting, cementing, fusing or some combination thereof. And to insure that there will be no seepage of helium through and within the areas of such attachments, some suitable sealant or sealing method may be used in the attaching process.

The web braces described herein may be composed of tough webbing materials suitably durable in all kinds of weather. I may include in their structure metal or plastic strapping or cable, or I may interweave metal threads therein.

The herein described conjoining of adjacent aero-trussed structures with their respective web braces 150 and 170 (FIG. 22), including the attaching thereto of the said end curtains J1, J2, J3 and J4, and fastening extensions F1 and F2, may be accomplished by some suitable means such as stitching, riveting, cementing, fusing or some combination thereof. Or, I may employ a fastening arrangement of nuts and bolts or the like, such as shown in FIG. 23.

THE ROOF CARRIAGE MEANS

In FIG. 9 is shown a pair of carriage assemblies K1 and K2 between which roof section R2 is attached in arching relationship, and which move the said section R2 into and out of sheltering position as shown in FIG. 1. A similar pair of carriage assemblies similarly arranged on either side of roof section R1 serve to move such section in like manner. Such carriage assemblies are intended to be illustrative of any suitable means capable of moveably supporting the said roof sections.

The two pairs of carriage assemblies are mounted on opposite sides 2 and 4 of the stadium structure and are protectively contained inside of upwardly projecting parapet wall portions which are extensions of the stadium sides 2 and 4. It will be understood that the central section of the stadium together with the wings W′ and W″ are constructed of some conventional building materials such as a typical steel or concrete framework as suggested in FIG. 9, together with steel and masonary surfacing materials. At the top of the two wing sections W′ and W″ on the steel framework indicated are provided a pair of decks H1 and H2 which form floor sections for the two bays B1 and B2.

Included in the two pairs of carriage assemblies are tracks Z1 and Z2 extending along the upper inside portion of sides 2 and 4 and which communicate between bays B1 and B2 over track ledge portions Q1 and Q2.

It will be noted in FIG. 16 that track Z1 which projects above deck H2 preferably comprises a pair of tubular members on which there may be formed annular ribs for purposes of traction. The track Z2 shown in FIG. 1 is similarly disposed and constructed.

On the said tracks Z1 and Z2 are disposed roof supporting frames X1 and X2 consisting of elongated box shaped structures, shown in detail in FIGS. 16 and 19, which extend substantially along the axial length of their respective sides of roof section R2, as shown in FIG. 9.

A similar pair of box shaped structures extend in similar fashion on either side of roof section R1, one of which (X4) is shown in detail in FIG. 21. It will be noted in FIG. 16 that at the undersides of the carriage assembly K1 are located a set of wheels 30 for engagement with the tracks Z1. I may provide these wheels, and the guide wheels 47 hereinafter described, with low pressure rubber tires.

It will be noted in FIG. 16 that the deck floor H2, although angularly disposed in the vicinity of the carriage means K1, extends therefrom on an arc of curvature corresponding generally to the curvature of the roof sections and that the tracks Z1 lie in a somewhat angularly disposed position. The wheels 30 are mounted on shafts 32 and 32A, the opposite ends of which shafts are rotatably mounted in bearings 33 and 34 which are journaled in hangers 35 and 36 depending from the bottom of frame X1. A motor 37 operates through gear means 38 and 39 driving the wheels 30 when desired. The frame X1 is of tubular construction and cross braced as shown in FIGS. 16, 19 and 21 in the conventional manner. Mounted on the deck at one side of carriage K1 is a bracket 40 in which is rigidly disposed in a horizontal guide channel 41 formed with a slot 43.

In this guide channel 41 is an octogonially shaped guide block 42, more clearly shown in FIG. 17. The guide block 42 is provided with a rod member 44 which is solidly fixed at its opposite end to an adjacent side of frame X1 as shown in FIG. 16. The guide block 42 (FIG. 17) has received therein a plurality of roller bearings as 46 which facilitate movement of the guide block in the guide channel 41 when the roof section respective thereto is moved.

The frame carriage K1 is further guided by a special guide wheel arrangement as shown at the upper left hand side of FIG. 16. Guide wheels 47 may be mounted on shaft means 48 fixed to the upper side of the frame as shown in FIG. 16, and the guide wheels 47 may be guided for horizontal movement in a track arrangement made up of two spaced apart I beam members 49 and 50 which are welded to a plurality of overhanging brackets 50A. This upper guide wheel apparatus is normally sheltered by an overhanging covering 51 which extends throughout the length of the inside of wall 4 atop the said brackets 50A.

The carriage K1 is provided with a top section 52 to which is secured in a flashing relationship the retaining extension D2 as shown in FIG. 16 together with a flashing strip 53 overlying the line of joinder of these parts. The edge of retaining extension D2 may, for example, be wrapped around a longitudinally disposed tubular frame piece 54 and may be securely clamped in place by some suitable means such as an adjustment bolt and clamp unit 55, as shown in FIGS. 16 and 21. Various other desirable fastening means may be employed for firmly securing the retaining extension D2 along the frame K1; such, for example, as those illustrated in FIGS. 24 and 25.

It is to be understood that the carriage assembly K2, which moves roof section R2 from the opposite side on track Z2, is similarly constructed, as is also its associated guide control, fastening and undercarriage means. And it is further to be understood that the paid of carriage assemblies, together with their respective guide control, fastening and undercarriage means, which operate to move roof section R1 on tracks Z1 and Z2 are likewise of similar construction.

THE HELIUM GAS SUPPLY SYSTEM

Mounted within supporting frame XI, as shown in FIGS. 16 and 19, and similarly in frame X4, as shown in FIG. 21, are the means for supplying the helium gas which sustains the roof sections R1 and R2 over the said area A and stands L1, L2, L3 and L4. To facilitate such purpose I may, as indicated in FIG. 21, connect every two successive aero-trussed bodies, such as T11 and T12 in pairs so that the total gas content in their respective gas compartments flow between both sets of gas compartments in a circulatory pattern.

Although FIG. 21 merely shows the manner in which the gas supply apparatus on frame X4 is connected to just one end of the aero-trussed bodies T11 and T12, it is to be understood that similar gas supply apparatus is mounted on frame X3 on the other side of roof sections R1, and is connected in complementary relationship to the opposite ends of the bodies T11 and T12 so as to complete the circulatory pattern. And it is to be understood further that similar pairs of gas supply apparatus are similarly mounted and connected on opposing sides of each pair of aero-trussed bodies in both roof sections.

As will be noted in FIG. 21 such gas supply apparatus in its reserve section 66 comprises a reserve gas tank 60A connected to a compressor 60 which directs a flow of helium gas into the gas comparment portion G3 of the body T11 through a conduit means 62 which is sealably connected to gas compartment end cap Y by means of gas access port Y1, which are shown in detail in FIG. 8.

In its recovery section 68, such gas supply apparatus comprises a conduit means 62 which is sealably connected to the gas compartment end cap Y of the body T12 by means of gas access port Y1. Also a compressor 61 which may effect a transfer of the helium gas from the gas compartments of the body T12 to the recovery tank 60B as shown in FIG. 21.

Also to be seen in FIG. 21 are several valves. Firstly, there is the reserve valve 100 which is opened when it becomes necessary to transfer helium gas from the reserve tank 60A to the gas compartments G1, G2, G3 and G4 of T11. Also, the two way recovery valve 102 which may be opened in communication with the gas compartments of T12 to effect a transfer of helium gas therefrom to the recovery tank 60B.

When a supply of helium gas it to be added to the system, the said recovery valve 102 may be opened in communication with its intake port 104 to effect a transfer of such supply to the recovery tank 60B. Then there is the two way transfer valve 106 which may be opened in communication with the reserve tank 60A to effect a transfer thereto from the recovery tank 60B. Such transfer valve 106 in communication with the recovery tank 60B may be opened to its take-off port 108 to remove helium gas from the gas supply system, as shown in FIG. 21.

Finally, there are the automatic relief valves 110, 112, 114, 116 and 118 which are designed to automatically permit the escape of such amount of helium gas as is necessary to reduce the gas pressure to safe limits when such is required.

In order to impart firmness to the roof sections R1 and R2 may introduce and maintain the helium gas therein at a pressure in excess of normal ground level atmospheric pressure so as to obtain tautness, but at a level of pressure calculated to pose no risk of rupture to the aero-trussed bodies.

THE ROOF SECTIONS HEATING SYSTEM

Also mounted within supporting frame X1, as shown in FIGS. 16 and 19, and similarly in frame X4 as shown in FIG. 21, are the heating means provided for the melting of snow or ice attempting to collect or form on roof sections R1 and R2.

To facilitate this purpose I may, as shown in FIG. 21, connect every two successive aero-trussed bodies, such as T11 and T12, in pairs so that the air in their respective thermal ducts 122 may flow between both sets of ducts in a circulatory pattern. As in the case of the gas supply system, it is to be understood that similar heating apparatus is mounted on frame X3 on the other side of the roof section R1, and is connected in complementary relationship to the opposite ends of the bodies T11 and T12 so as to complete the circulatory pattern. And it is to be understood further that similar pairs of apparatus are similarly mounted and connected on opposing sides of each pair of aero-trussed bodies in both roof sections.

As will be noted in FIG. 21 such heating system in its reserve section 66 comprises a heater 70 atop which are a plurality of circulating blower fans 72 which upon receiving heated air from such heater through elbow connections, as shown, thereupon directs a flow of the same into the thermal ducts 122 of the body T11 through a plurality of conduit means 74 which connect respectively to a plurality of thermal end caps V by means of hot air access ports 78, which are shown in detail in FIG. 8.

It may be seen in FIG. 21 that such heating system in its recovery section 68 comprises a heater 70A atop which are a plurality of circulating in-take fans 72A which receive the heat depleted air from the thermal ducts 122 of the body T12 through a plurality of conduit means 74A which connect respectively to a plurality of thermal end caps V by means of thermal access ports 78. Upon receiving such air these fans thereupon direct the flow of the same into the heater 70A from whence it passes, after reheating, through a conduit means 75 into the heater 70 for further heating.

In the course of circulating through the thermal ducts of T11 and T12, the thermal content of the hot air will be imparted to the exterior covering section E11 and E12 so as to cause them and the adjoining web strips W12, W13 and W14 to become warm enough to melt the said snow or ice.

Since air occupying such thermal ducts in an unheated condition would impose weight upon the roof sections, I may use helium gas for heating purposes in lieu of air. This requires that all joints, seams and connections in the heating system would need to be hermetically sealed. In such case I may also include in such system a two way thermal transfer valve 98 for the purpose of transferring helium gas into and out of such heating system.

The hot air heaters employed may be of the oil or gas fuel type or they may be the kind that uses electric current to generate thermal capacity.

These heaters 70 and 70A together with the gas tanks 60A and 60B, the compressors 60 and 61, the circulating fans 72 and 72A, the valves 98, 100, 102, 106, 110, 112, 114, 116 and 118, the conduit means 62, 74, 74A and 75 and the other accessories shown in FIGS. 16, 19 and 21, such as the gutters 84, the drain pipes 86, the stadium ventalating fans 80 and their motors 82 may be conventional commercially available types.

ROOF SECTION CRADLE MEANS

As earlier noted I have provided cradle means for engaging and supporting the two roof sections R1 and R2 when in retracted positions in their respective bays B1 and B2. The cradle means generally consists of two sets of carrying frames which are vertically adjustable in the bays B1 and B2 through decks H1 and H2 to engage and carry respective roof sections in a raised position with respect to immediately underlying deck surfaces when the roof sections are not in use.

As shown in FIG. 1, the carrying frames in bay B1 are comprised by a plurality of conforming arched members which are denoted by numerals 90 and 90A and similar arched ribs 92 and 92A in bay B2 and these occur in spaced apart relationship to coincide with the spacing of the said web braces 150.

As may be noted in FIGS. 1, 11, 12 and 13, each carrying frame comprises: a plurality of columns 132 which extend through and below the deck surfaces H1 and H2; a plurality of lower chords 134 extending transversely between the said columns 132 on a line of curvature conforming to the said deck surfaces; a plurality of panels 136 disposed along the same curvature and interconnecting with the said chords and columns; and finally an upper bar shaped rest plate 138 which conforms substantially to the same width and curvature as the aforesaid web braces 150. Such rest plates extend atop and in connection with the said columns 132 and panels 136, all of which are shown in detail in FIGS. 12 and 13, which figures also illustrates the manner in which such rest plates 138 provide support for a roof section in cradle relationship.

In addition, I may, as shown in FIG. 12, effect such periodic attachments of the roof sections R1 and R2 to their respective carrying frames by a plurality of cordage ties 148, hanging in pairs at suitable intervals from the bottom of the said web braces 150 from whence they pass through correspondingly spaced apertures 139 formed in the said rest plates 138 and which are then tied to adjacent snubbing posts 152 located on both sides of the said panels 136.

It will be noted in FIG. 11 that the carrying frames 90A and 92A are provided with transversely disposed tubular retaining members 95 which extend laterally from the rest plate portions 138 thereof, to which they are connected by a plurality of extension springs 94, as shown in detail in FIG. 15.

In order that the roof sections have unobstructed passage in their travel into and out of sheltering position over the playing area A and stand portions L1, L2, L3 and L4, the frames 90, 90A, 92 and 92A are made capable of vertical movement. Such vertical movement is actuated by hydraulic cylinders 160 in which may be located the lower portions of the columns 132, as shown in FIG. 11. Such cylinders are located in a working space 162 provided just beneath the deck H1 and H2.

It will be noted in FIG. 11 that when the roof sections R1 and R2 are in retracted positions in bays B1 and B2, their end curtains J1, J2, J3 and J4 will be secured to their respective roof deck H1 and H2. This securing will be accomplished by fastening a plurality of straps 20 hanging at suitable intervals from the bottom of such curtains to a plurality of deck buckles 22 attached at corresponding intervals to the decks respective thereto, in the manner shown in FIGS. 11, 19 and 20.

In FIG. 14 is illustrated one manner in which I may interlock the two roof sections R1 and R2 so that they may be travelled into the position where they completely shelter playing area A and stands L1, L2, L3 and L4, as shown in FIGS. 1, 3 and 10. Firstly, it will be noted in FIG. 14 that the bottom portion of the inner curtain J2 in section R1 is turned up to form a drain flap 21 so as to make it adaptable for mating with inner curtain J3 on roof section R2 in such manner that this flap will channel along its curved bottom portion rainwater draining from both roof sections.

It will be further noted in FIG. 14 that such interlocking is first accomplished by fastening a plurality of said straps 20 hanging from the bottom of the inner curtain J3 to a plurality of drain buckles 26 attached at corresponding intervals along the edge of said drain flap. Incidentally, such drain buckles 26 are fastened to correspondingly placed drain straps 24 when roof section R1 is in retracted position.

The interlocking of the two roof section is then completed by fastening a plurality of straps 27 attached at suitable intervals atop the inner edge of section R2 to a plurality of buckles 25 attached at corresponding intervals atop the inner edge of roof section R1.

When such interlocking process has been completed, the coupled sections R1 and R2 are then travelled into the sheltering position described above. The outer end curtains J1 and J4 on roof sections R1 and R2 respectively will then be secured to the edges of their respective decks H1 and H2 as indicated in FIF. 10 FIG. 15 shows in detail the manner of such securing. Although this figure merely shows how the outer curtain J1 on section R1 is fastened to the edge of deck H1, it is to be understood that the outer curtain J4 on roof sertion R2 is similarly fastened. Such fastening, as noted in FIG. 15, may be accomplished by fastening the said plurality of straps 20 hanging from the curtains J1 and J4 to a plurality of deck buckles 22 correspondingly attached along the edges of their respective decks H1 and H2.

Following this, the mastening extensions F1 and F2 are secured to their respective tubular retaining members 95 as shown in FIG. 10. This may be accomplished by fastening a plurality of straps 28 attached at suitable intervals along the inside surface of each fastening extening extension F1 and F2 to a plurality of buckles 29 attached at corresponding intervals along the edge of such extensions, in the manner shown in FIG. 15.

It is to be understood that this invention is not to be limited to the employment of straps and buckles to accomplish the aforedescribed fastening procedures. The use of such very conventional means is suggested by the fact that the strap portions may be attached so that they coincide lineally with the longitudinal braces, such as are shown in FIG. 22. I may in lieu thereof use a variety of other conventional fastening devices to make such attachments.

It will be noted in FIG. 1 that the parapet wall extensions of stadium sides 2, 4, 6 and 8 rise to a height just above the crown of the two roof sections R1 and R2. By enclosing both roof sections on all four sides there is provided a considerable measure of protection to them from the direct impact of the varying winds so as to lessen the force which such winds might expend upon them. Although not shown as such in FIG. 1, I may include moveable louvres within their structure.

And since the deflecting action of the parapet walls will interpose an interruption in the free flow of wind over the surface of the roof sections, the heat depleting ability of such flow will also be lessened.

Aside from the stiffening effect that the carrying frame panels impart to the frame structures of which they are a part, they will, also, I believe, provide some assistance in deflecting and interrupting the free flow of wind over the two roof sections.

Although FIG. 1 shows less than one-half of the carrying frames 90, 90A, 92 and 92A in elevated posture, it is to be understood that in response to a variety of wind conditions, all, none or various combinations of them may be elevated for the purpose of obtaining whatever wind deflecting assistance they may provide.

Encased at suitable intervals along the bottom portion of the parapet walls on stadium sides 2 and 4 are a plurality of ventilating fans 80 as shown in FIGS. 1, 2 and 3. As their name denotes, their function is to remove stale air and fumes from the stadium. To facilitate this purpose, these fans, it will be noted in FIG. 21, are positioned so that they face the spaces formed between adjoining aero-trussed bodies; thereby providing them with channels along which they may direct the flow of air.

In the process of exhausting air along such channels, these fans will, I believe, tend to somewhat relieve the underside of the two roof sections R1 and R2 of upwardly bearing air pressure. It will be noted in FIG. 16 that I have provided such fans with moveable louvres 85 which will enable a barring of entry therethrough of wind, rain and snow when such fans are not in use.

FIGS. 22, 28 and 29 illustrate modified forms of the invention, showing three ways in which I may span large areas with a stationary aero-trussed roof or housing structure. While these three figures illustrate barrel, hemispherical and ridge type designs respectively, it is to be understood that the invention is not limited to those shapes. And it is to be understood further that the invention is not limited to roof type structures. I may construct aero-trussed arched structures the compass of compass of which extends from ground level to ground level on two or more sides. And it is to be understood that the aero-trussed feature may be used in the construction of side wall or other vertical supporting structures, as well as in the construction of canopy or other angular, arcuate or horizontal overhanging structures.

FIG. 22 is a modified form of the stadium construction shown in FIG. 1 without the wing portions W′ and W″, but leaving the central section C enclosing the said area A and stands sheltered by a single aero-trussed roof section R3. Since such roof section is stationary, it will permanently span the said stadium in all kinds of weather, and it will, of course, not require the use of a carriage, guide or track means.

But helium gas supply and roof heating systems will be provided for this roof section also similar to those illustrated in FIGS. 16, 19 and 21. In FIG. 25 may be seen the rear part of the ledge portions 182 which extend along the upper inside of walls 2 and 4. The apparatus which comprises the two systems are mounted upon the forward part (not visible in FIG. 25) of such ledge portions 182.

As shown in FIG. 22 roof section R3 will be of a composition and construction similar to that of sections R1 and R2, excepting for the manner in which adjacent aero-trussed bodies are joined together. Since in the case of roof section R3 there will be no opportunity to make an easy replacement of an aero-trussed body within shop-like confines such as provided by bays B1 and B2, I may join the individual aero-trussed bodies together with nuts and bolts or the like, as shown in FIG. 23.

The use of such conventional fastening means will provide a simple method for replacing an aero-trussed body with facility, and, in addition, it will provide a means to which sling staging devices may be attached.

In order to further strengthen roof section R3, I may include in its construction a plurality of longitudinally disposed web braces 170 in the manner shown in FIGS. 22 and 27. It will be noted from a study of FIG. 23 that such braces are secured so that they form continuous strips by means of web plates 172 through which a nut and bolt 178 fastening arrangement also effects connection between the transverse 150 and longitudinal 170 braces, as well as contributing to the securing together of adjacent aero-trussed bodies.

In addition to the nuts and bolts 178 shown in FIG. 23 there are a plurality of other nuts and bolts which are directly in line therewith at suitable intervals along the web strip portions (W1 through W13) and which, therefore, are not visible in FIG. 23. These other nuts and bolts differ from those first mentioned 178 in that they serve only to conjoin adjacent aero-trussed bodies together with their respective transverse web braces 150.

Illustrated in FIG. 25 is the fastening device 174 which I may use to secure the exterior covering retaining end D3 on Section R3 to the inside of stadium walls 2 and 4. While this figure shows such device as it relates to stadium wall 2, it is to be understood that a similar device is also provided with reference to stadium wall 4.

It will be noted that such device comprises a pair of angularly disposed metal clamping plates which extend along the inside of their respective walls, and which are provided with a plurality of nuts and bolts, as shown, spaced at suitable intervals along their length, that enable them to clamp within their confine the retaining end D3 and associated web brace portions 150 and 170 respective to them.

It will be noted further that the bottom plate on such device 174 is attached to a plurality of wall brackets 175 spaced at suitable intervals to which connection is made by means of a plurality of correspondingly spaced extension springs 177.

I may also provide similar devices 171 together with connecting springs 183 and wall brackets 181 for the securing of fastening extensions F1 and F2 on roof section R3 to the inside of stadium walls 8 and 6 respectively as shown in FIG. 24. Such devices differ from those provided for stadium walls 2 and 4 in that their clamping plate portions are horizontally disposed and extend in an arc of curvature conforming to that of the roof section R3. Conforming to substantially the same curvature are the end ledges 176, extending along the upper side of walls 6 and 8, as shown in FIG. 24. Extending along the upper insides of said walls 2, 4, 6 and 8 are the flashing strips 173 which provide a watertight seal between roof section R3 and the said walls, as shown in FIGS. 24 and 25.

FIG. 26 shows a modified form of the invention which differs from the form illustrated in FIG. 22 in that it includes a plurality of web braces 179 which dispose diagonally rather than longitudinally, with only one of the latter.

It is to be understood that this invention is not limited to aero-trussed structures comprising tubular bodies the gas filled portions of which extend contiguously virtually the full length of the aero-trussed arched structure, as shown in FIG. 9. Such aero-trussed structures may comprise pairs of gas filled tubular bodies which converge upwardly into juncture with one another as in a ridge type structure of the kind shown in FIG. 29.

Or, such aero-trussed structures may comprise a plurality of gas filled triangular shaped bodies conjoined so that they converge upwardly in hemispherical fashion, as shown in FIG. 28, or in conical fashion, not shown, to form the said structure.

I may also construct these aero-trussed structures in such manner that they comprise a plurality of pod-like bodies incorporated therein. While such bodies may be formed in a variety of shapes, I may, for example, provide them with a rectangular pillow shaped configuration so that their incorporation within a structure of the type shown in FIG. 22 may be accomplished by interfitting them within the space areas 180 defined by the longitudinal braces 170 and web strips (W1 through W13).

However, it is to be understood that this invention is not to be limited to gas filled pod bodies of that configuration. Nor is it to be limited to the incorporation of such pod-like bodies into structures of the type illustrated in FIGS. 22, 26, 28 and 29. It will therefore be further understood that the method and apparatus of the invention may be varied or changed in other ways within the scope of the appended claims.

I claim:

1. A stadium-type arena including an area for a playing field and a seating area for spectators, an enclosure structure surrounding said areas and comprising vertical front and rear walls and two vertical end walls, a stadium wing poitioned outside of said area for a playing field, said wing comprising one of said end walls and front and rear walls and a top wall, the top wall providing a fixed roof section, a movable roof section adjustable on the front and rear walls which surround said area and being arranged in retracted position above said fixed roof section, and power driven carriage means for advancing the movable roof section from retracted position from said fixed roof section to a position to overlie and shelter said areas, said movable roof section comprising a plurality of multi-ducted tubular arches, an exterior cover sheet fixed to and covering said arches, said cover sheet being secured to said carriage means, selected ducts having a lighter-than-air gas therein, other selected ducts being adapted for the circulation of a heat exchange medium therethrough.

2. A structure according to claim 1 in which the cover sheet comprises a plurality of cover strips which are detachably joned together.

3. A structure accordng to claim 1 in which each of the multi-ducted tubular arches is separately attached to the cover strip which overlies it.

4. A structure according to claim 1 in which the cover sheet is reinforced with transversely disposed webbing members.

5. A structure according to claim 1 in which the cover sheet is reinforced with longitudinally disposed webbing members.

6. A structure according to claim 1 in which the cover sheet is reinforced with diagonally disposed webbing members.

7. A structure according to claim 1 in which each of the said vertical walls, excepting the end wall adjoining the said enclosure structure and the stadium wing, project upwardly to a height above the top of the said movable roof.

8. A structure according to claim 1 in which said carriage means includes horizontally disposed rail elements, frame sections, wheels supporting the frame sections for rolling on said rails, power driving means and transmission means for activating the said wheels; and longitudinally disposed tubular members which have cooperating locking fastening elements for detachably securing the said cover sheet to the carriage means.

9. A structure according to claim 1 in which the cover sheet projects upon the extremities of the multiducted tubular arches to provide marginal anchoring edges which are wrapped around the said tubular member and secured thereto by the fastening elements.

10. A structure according to claim 1 in which the said rail elements are provided with annular ribs to engage with the carriage wheels in a yieldable manner.

11. A structure according to claim 1 in which each pair of carriage wheels is activated by a separate electric motor and transmission means.

12. A structure according to claim 1 in which said fixed roof section has mounted therein supporting frames which are vertically adjustable into a position to engage with the underside of the movable roof section and support same when the movable roof section is in a retracted position.

13. A structure according to claim 1 in which said fixed roof section underlying the carriage means is inclined and extends in substantially equally spaced parallel relationship to the movable roof section.

14. A structure according to claim 1 in which the said fixed roof section has mounted thereon bracket elements which project upwardly in radially extending relationship to the movable roof section, said bracket elements having secured thereto longitudinally disposed slotted tubular members and said tubular members enclosing a plurality of bearing blocks which connect to the said carriage means.

15. A structure according to claim 1 in which the carriage means is provided with a plurality of rubber tire guide wheels and a pair of overhead rail elements for receiving the guide wheels and extending at an angle generally coincidental with the curvature of the movable roof section, and bracket means projecting from the front and rear walls in overhanging relation to the said carriage means and having the overhead rail elements secured thereto.

References Cited

UNITED STATES PATENTS

| | | | |
|---|---|---|---|
| 1,417,573 | 5/1922 | Salata | 52—66X |
| 2,052,217 | 8/1936 | De Sibour et al. | 52—64X |
| 2,411,316 | 11/1946 | Capita | 52—2 |
| 2,591,829 | 4/1952 | Katzenmeyer et al. | 52—2 |
| 2,830,606 | 4/1958 | Daugherty | 52—2 |
| 2,832,362 | 4/1958 | Critoph | 52—64X |
| 3,177,668 | 4/1965 | Schneider et al. | 52—115X |
| 3,298,382 | 1/1967 | Larson | 52—2X |
| 3,381,422 | 5/1968 | Olson | 52—66 |
| 3,433,470 | 3/1969 | Erke | 52—2X |

FRANK L. ABBOTT, Primary Examiner

S. D. BURKE III, Assistant Examiner

U.S. Cl. X.R.

52—6, 64; 4—172.14